United States Patent
Sumi et al.

(10) Patent No.: US 9,432,540 B2
(45) Date of Patent: Aug. 30, 2016

(54) IMAGE DEFECT DETECTION DEVICE, IMAGE DEFECT DETECTION METHOD, AND IMAGING UNIT

(71) Applicant: FUJIFILM Corporation, Tokyo (JP)

(72) Inventors: Katsuto Sumi, Ashigarakami-gun (JP); Osamu Kuroda, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/717,206

(22) Filed: May 20, 2015

(65) Prior Publication Data

US 2015/0347059 A1    Dec. 3, 2015

(30) Foreign Application Priority Data

May 28, 2014   (JP) .................................. 2014-110429

(51) Int. Cl.
*B41J 29/393*   (2006.01)
*H04N 1/00*   (2006.01)
*G06K 15/10*   (2006.01)

(52) U.S. Cl.
CPC ........ *H04N 1/00801* (2013.01); *G06K 15/102* (2013.01); *H04N 1/00037* (2013.01)

(58) Field of Classification Search
CPC .......... H04N 1/00801; H04N 1/0037; G06K 15/102; B41J 2/2142; B41J 2/0451; B41J 2/04558; B41J 2/165; B41J 2/16579; B41J 29/393; B41J 2029/3935
See application file for complete search history.

(56) References Cited

U.S. PATENT DOCUMENTS

| | | | | |
|---|---|---|---|---|
| 4,516,023 A | * | 5/1985 | Morrill | B41J 2/471 250/235 |
| 2002/0186268 A1 | * | 12/2002 | Endo | B41J 2/16508 347/19 |
| 2004/0124363 A1 | * | 7/2004 | Yoshida | G03F 7/7065 250/372 |
| 2009/0279079 A1 | * | 11/2009 | Shibata | G01N 21/95623 356/237.3 |
| 2011/0221857 A1 | * | 9/2011 | Tatsuno | B41J 2/471 347/259 |
| 2015/0015635 A1 | * | 1/2015 | Piatt | G01B 11/14 347/16 |

FOREIGN PATENT DOCUMENTS

JP    2006-240000 A    9/2006

* cited by examiner

*Primary Examiner* — Geoffrey Mruk
*Assistant Examiner* — Scott A Richmond
(74) *Attorney, Agent, or Firm* — Studebaker & Brackett PC

(57) ABSTRACT

Disclosed are an image defect detection device, method and an imaging unit capable of reliably detecting image defect, such as stripe unevenness or scratches, even if a comparatively inexpensive and low resolution imaging unit is used. An image reading unit has a plurality of read pixels arranged in a second direction intersecting a first direction and reads an image recorded on a recording medium by a single-pass recording head, which is relatively moved in the first direction. A birefringent plate shifts and duplexes the image at least in the second direction by performing birefringence of image light of the image. The birefringent plate makes the width of image defect in the second direction on the read pixels greater than the pitch of the read pixels. A detection unit which detects image defect included in the image and extended in the first direction based on the reading result of the image.

20 Claims, 19 Drawing Sheets

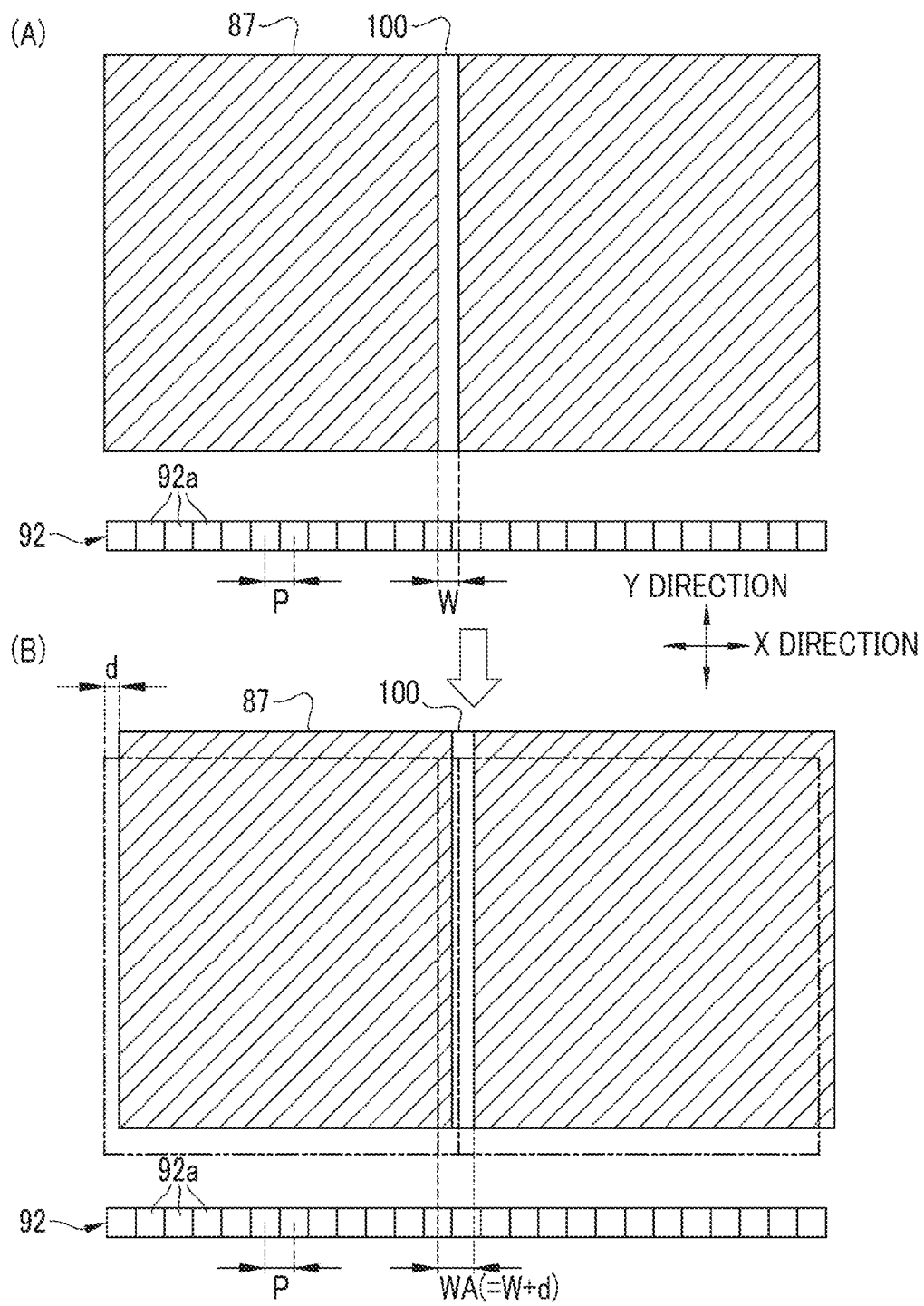

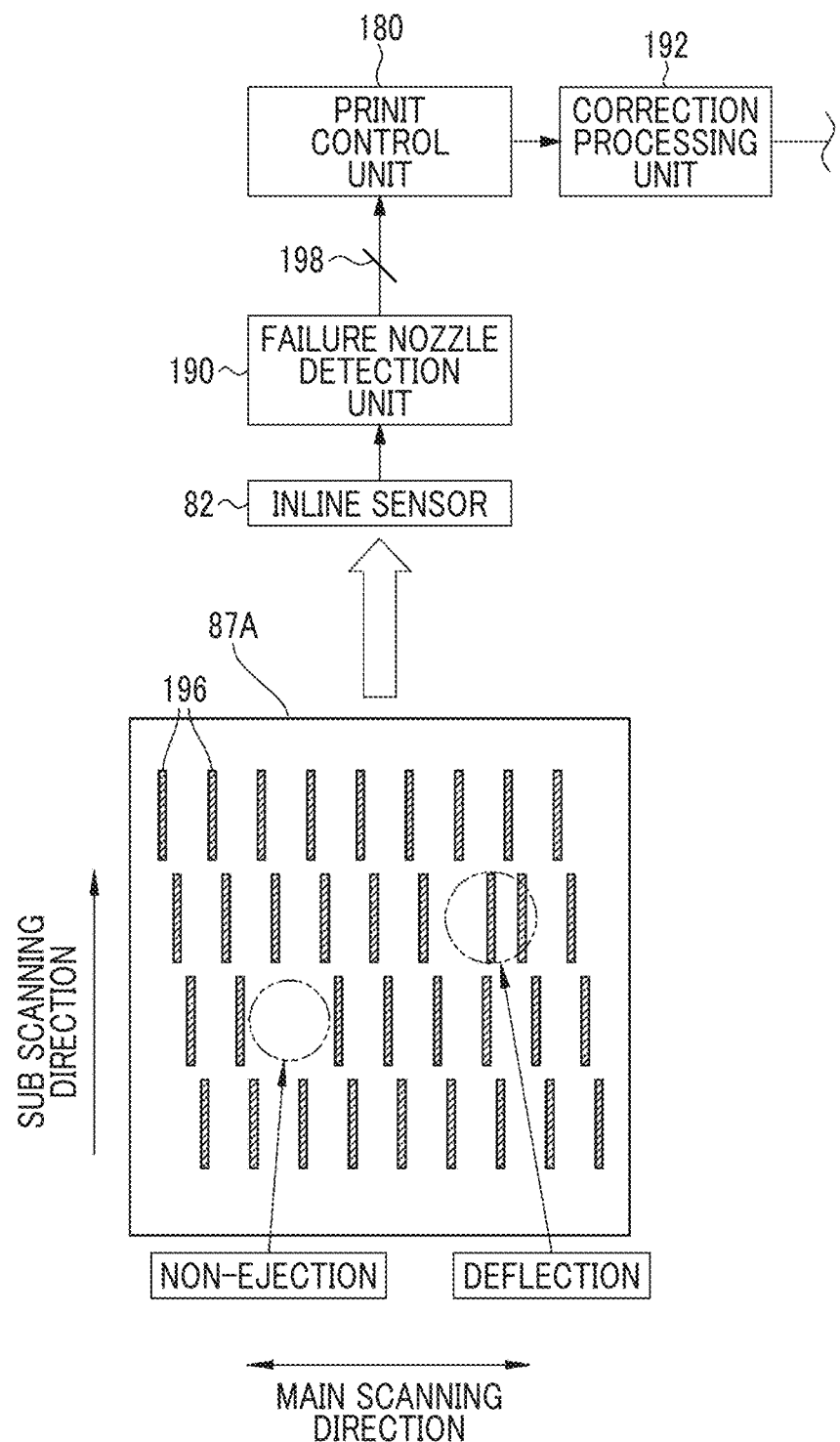

IMAGE DEFECT DETECTION DEVICE, IMAGE DEFECT DETECTION METHOD, AND IMAGING UNIT

CROSS-REFERENCE TO RELATED APPLICATIONS

The present application claims priority under 35 U.S.C. §119 to Japanese Patent Application No. 2014-110429, filed on May 28, 2014. Each of the above application(s) is hereby expressly incorporated by reference, in its entirety, into the present application.

BACKGROUND OF THE INVENTION

1. Field of the Invention

The present invention relates to an image defect detection device and an image defect detection method which detect image defect, and an imaging unit for image defect detection.

2. Description of the Related Art

A single-pass ink jet recording apparatus which forms an image on a recording medium by ejecting ink droplets from a plurality of ink ejection nozzles (hereinafter, simply referred to as nozzles) provided in an ink jet head while relatively moving the recording medium and the ink jet head has been known.

In the ink jet recording apparatus, a failure nozzle, such as a non-ejection nozzle which cannot eject ink droplets due to clogging or breakdown over time or a deflected nozzle in which the amount of flight deflection of ink droplets is increased, is generated. In this case, in the single-pass ink jet recording apparatus, stripe unevenness (white stripe or white-black stripe) of a shape extended in a transport direction of the recording medium (or a moving direction of the ink jet head) occurs in a recorded image. In addition, scratches extended in the transport direction occur in the recorded image due to contact between a recording surface of the recording medium and a member constituting a transport system of the recording medium. For this reason, an ink jet recording apparatus which has a function of detecting image defect, such as stripe unevenness or scratches, is well known.

For example, JP2006-240000A describes an ink jet recording apparatus which detects image defect using an imaging unit provided with an optical sensor having a plurality of read pixels disposed on a plane and an image forming optical system. In an image defect detection device, a sensor light receiving surface of the optical sensor and a principal plane of a lens are inclined with respect to the recording surface of the recording medium which is a surface of an object to be measured. With this, even when the distance between the imaging unit and the recording surface of the recording medium is changed, an image of the recording surface is focused on any place on the sensor light receiving surface. Therefore, it is possible to obtain a signal of a focused image. As a result, it is possible to detect image defect.

SUMMARY OF THE INVENTION

However, the magnitude (the size in a direction orthogonal to the transport direction) of the width of image defect, such as stripe unevenness or scratches, is extremely small, for example, about 50 μm. For this reason, in the image defect detection device of JP2006-240000A, if the magnitude of the width of image defect to be detected is smaller than the pitch of the read pixels of the optical sensor, image defect may not be detected depending on the positional relationship between image defect and the read pixels. For example, when there is a blank portion, such as a channel stop, between the read pixels, an area where image defect cannot be detected in the optical sensor is extended. For this reason, if image defect is positioned in the blank portion, image defect may not be detected.

Accordingly, in order to reliably detect image defect having a width of about 50 μm with the imaging unit of JP2006-240000A, in general, a resolution of about ½ to ¼ (for example, 10 to 25 μm) of the width of image defect is required. For this reason, the imaging unit needs to have a high resolution (for example, about 1200 to 2400 dpi). However, such a high resolution imaging unit is expensive. The high resolution imaging unit has an increasing amount of data in proportion to the resolution (or the second power of the resolution). Therefore, the amount of data is limited by a restriction on a data transfer rate, resulting in degradation of performance.

The invention has been accomplished in consideration of this situation, and an object of the invention is to provide an image defect detection device, an image defect detection method and an imaging unit for image defect detection capable of reliably detecting image defect, such as stripe unevenness or scratches, even if a comparatively inexpensive and low resolution imaging unit is used.

According to an aspect of the invention, there is provided an image defect detection device including: an image reading unit which reads an image recorded on a recording medium by a single-pass recording head, which is relatively moved in a first direction with respect to the recording medium, the image reading unit having a plurality of read pixels arranged in a second direction intersecting the first direction; a birefringent plate which shifts and duplexes the image read by the image reading unit at least in the second direction by performing birefringence of image light of the image incident on the image reading unit; and a detection unit which detects image defect included in the image and extended in the first direction based on the reading result of the image read by the image reading unit through the birefringent plate, in which the birefringent plate makes the width of the image defect in the second direction on the read pixels greater than the pitch of the read pixels by duplexing the image.

According to the invention, it is possible to detect image defect without depending on the positional relationship between image defect and the read pixels. Image light of an image is duplexed by birefringence, whereby it is possible to make the rising angle and the falling angle of the edge of the light quantity distribution of image light incident on the image reading unit sharp compared to a case where image light is blurred or expanded. As a result, it is possible to accurately detect the position of a pattern for detecting a failure element, thereby performing failure element detection simultaneously.

In the image defect detection device according to an aspect of the invention, when the width of the image defect in the second direction on the read pixels in the case where the birefringent plate is not disposed is W, the pitch of the read pixels is P, and a shift amount of the image duplexed by the birefringent plate in the second direction is d, if the pitch of the read pixels satisfies P≥W, the birefringent plate may shift the image in the second direction by d, which satisfies Expressions (2) and (3) when the width of the image defect in the second direction on the read pixels is expanded from W to WA represented by Expression (1) by duplexing the image.

$$WA = W + d \quad (1)$$

$$d < W \quad (2)$$

$$WA > P \quad (3)$$

With this, it is possible to make the width of the image defect in the second direction on the read pixels greater than the pitch of the read pixels. Therefore, it is possible to detect image defect without depending on the positional relationship between image defect and the read pixels.

In the image defect detection device according the aspect of the invention, the shift amount may be adjustable by adjusting the thickness of the birefringent plate or the number of the birefringent plates. With this, it is possible to appropriately adjust the shift amount.

In the image defect detection device according the aspect of the invention, the shift amount may be adjustable by adjusting the angle of the birefringent plate within a plane perpendicular to the optical axis of the image light. With this, it is possible to appropriately adjust the shift amount.

The image defect detection device according to the aspect of the invention may further include: an optical system which guides the image light of the image recorded on the recording medium to the image reading unit, in which the birefringent plate is provided in the optical path of the image light inside the optical system. A birefringent plate may be only added to an existing inline sensor for image defect detection. Therefore, it is possible to detect image defect at low cost.

The image defect detection device according to the aspect of the invention may further include: a moving unit which relatively moves one of the recording medium and the image reading unit in the first direction with respect to the other, in which the image reading unit reads the image by single relative movement with respect to the recording medium. With this, it is possible to detect image defect in a short time.

In the image defect detection device according to the aspect of the invention, the recording head may have a plurality of recording elements arranged in the second direction, and the detection unit detects stripe unevenness caused by a failure element among the recording elements of the recording head as the image defect. With this, it is possible to reliably detect stripe unevenness.

According to another aspect of the invention, there is provided an image defect detection method using the image defect detection device including: an image reading step of reading an image recorded on a recording medium by a single-pass recording head, which is relatively moved in a first direction with respect to the recording medium, the image being read by an image reading unit having a plurality of read pixels arranged in a second direction intersecting the first direction; a birefringence step of shifting and duplexing the image read by the image reading unit at least in the second direction by performing birefringence of image light of the image incident on the image reading unit with a birefringent plate; and a detection step of detecting image defect included in the image and extended in the first direction based on the reading result of the image read by the image reading unit through the birefringent plate, in which, in the birefringence step, the width of the image defect in the second direction on the read pixels is made greater than the pitch of the read pixels by duplexing the image.

According to a still another aspect of the invention, there is provided an imaging unit used for the image defect detection device including: an image reading unit which reads an image recorded on a recording medium by a single-pass recording head, which is relatively moved in a first direction with respect to the recording medium, the image reading unit having a plurality of read pixels arranged in a second direction intersecting the first direction; and a birefringent plate which shifts and duplexes the image read by the image reading unit at least in the second direction by performing birefringence of image light of the image incident on the image reading unit, the birefringent plate making the width of image defect in the second direction on the read pixels greater than the pitch of the read pixels by duplexing the image, and the image defect being included in the image and extended in the first direction.

The image defect detection device, the image defect detection method, and the imaging unit of the invention can reliably detect image defect, such as stripe unevenness or scratches, even if a comparatively inexpensive and low resolution imaging unit is used.

BRIEF DESCRIPTION OF THE DRAWINGS

FIG. 6 is a schematic view of image light of a test chart incident on read pixels of an image sensor when a birefringent plate is not disposed or through a birefringent plate.

FIG. 15 is a schematic view of a test chart for failure nozzle detection.

DESCRIPTION OF THE PREFERRED EMBODIMENTS

Ink Jet Recording Apparatus of First Embodiment

<Overall Configuration of Ink Jet Recording Apparatus>

Figure 1:
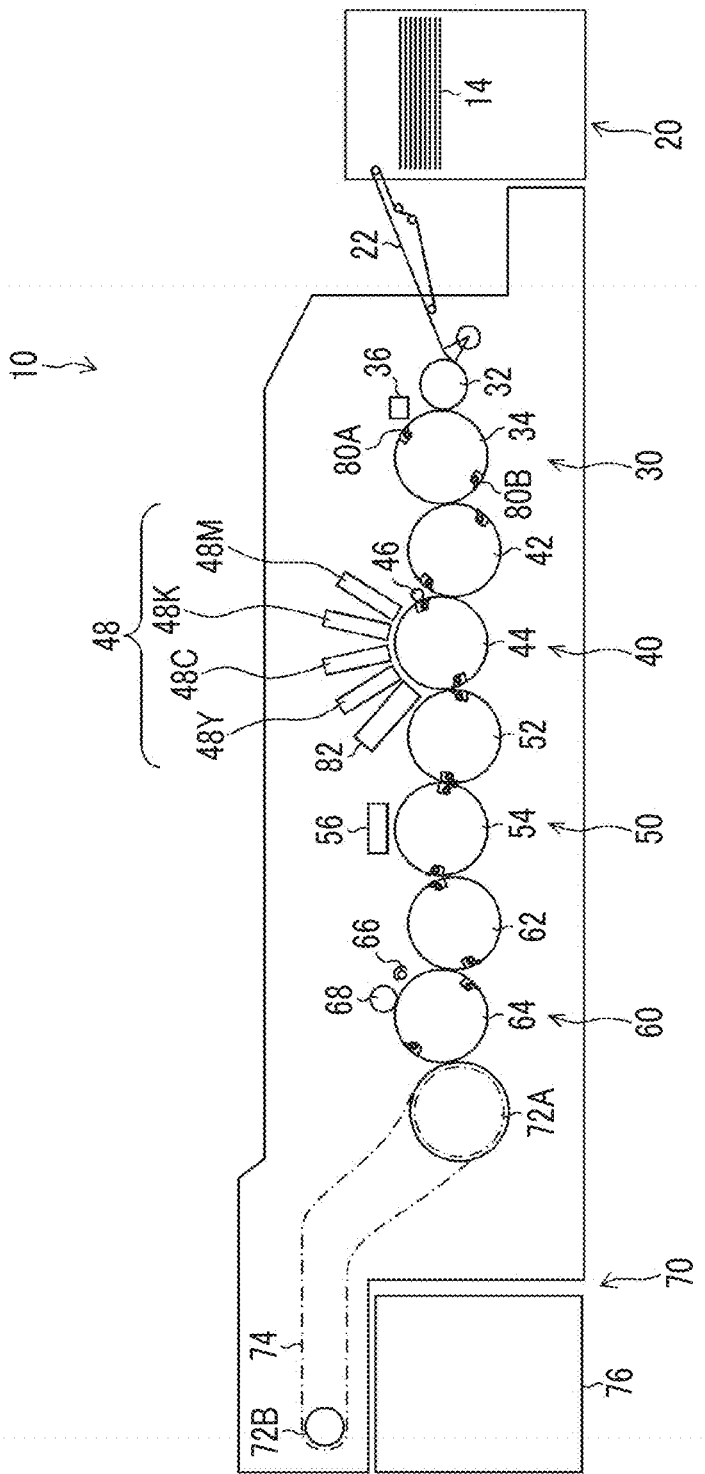
FIG. 1 is an overall configuration diagram of an ink jet recording apparatus.

FIG. 1 is an overall configuration diagram of an ink jet recording apparatus 10 provided with an image defect detection device and an imaging unit of the invention. The ink jet recording apparatus 10 uses a pressure drum transport method which transports a recording medium 14 while holding the recording medium 14 on the outer peripheral surface of a pressure drum.

Ink jet heads 48M, 48K, 48C, and 48Y (hereinafter, simply abbreviated as ink jet heads 48) which eject ink to the recording medium 14 are disposed obliquely with respect to the horizontal plane such that the nozzle surfaces thereof are orthogonal to the normal to the outer peripheral surface of the pressure drum (drawing drum 44). The ink jet heads 48 correspond to a recording head of the invention.

The ink jet recording apparatus 10 is provided with a recording medium storage unit 20 in which recording mediums 14 before image recording are stored, a process liquid coating unit 30 which coats the recording medium 14 fed from the recording medium storage unit 20 with a process liquid, a drawing unit 40 which records a desired color image by ejecting color ink to the recording medium 14 coated with the process liquid, a drying unit 50 which dries the recording medium 14 with the color image formed thereon, a fixing unit 60 which performs a fixing process on the recording medium 14 after drying process, and a discharge unit 70 which discharges the recording medium 14 after the fixing process.

The recording medium 14 transferred to a transfer drum 32 through a sheet feed tray 22 is supported by a process liquid drum 34 while the leading end portion of the recording medium 14 is gripped by grippers 80A and 80B of the process liquid drum 34, and is transported along the outer peripheral surface of the process liquid drum 34 with the rotation of the process liquid drum 34.

If the recording medium 14 transported in rotation by the process liquid drum 34 reaches the process area of a process liquid coating device 36 disposed at a position opposed to the outer peripheral surface of the process liquid drum 34, the surface of the recording medium 14 on which an image is recorded is coated with the process liquid. The process liquid which is coated by the process liquid coating device 36 has a function of aggregating or insolubilizing coloring agents included in color ink by reacting with color ink ejected from the ink jet heads 48.

The recording medium 14 coated with the process liquid is transferred to the drawing drum 44 through a transfer drum 42, is held on the outer peripheral surface of the drawing drum 44, and is transported in rotation along the outer peripheral surface of the drawing drum 44.

A sheet pressing roller 46 is disposed immediately before the ink jet heads 48 on the upstream side thereof in a sub scanning direction (corresponding to a first direction of the invention) parallel to the recording medium transport direction. The sheet pressing roller 46 brings the recording medium 14 immediately before entering directly below the ink jet heads 48 into close contact with the outer peripheral surface of the drawing drum 44.

Figure 2:
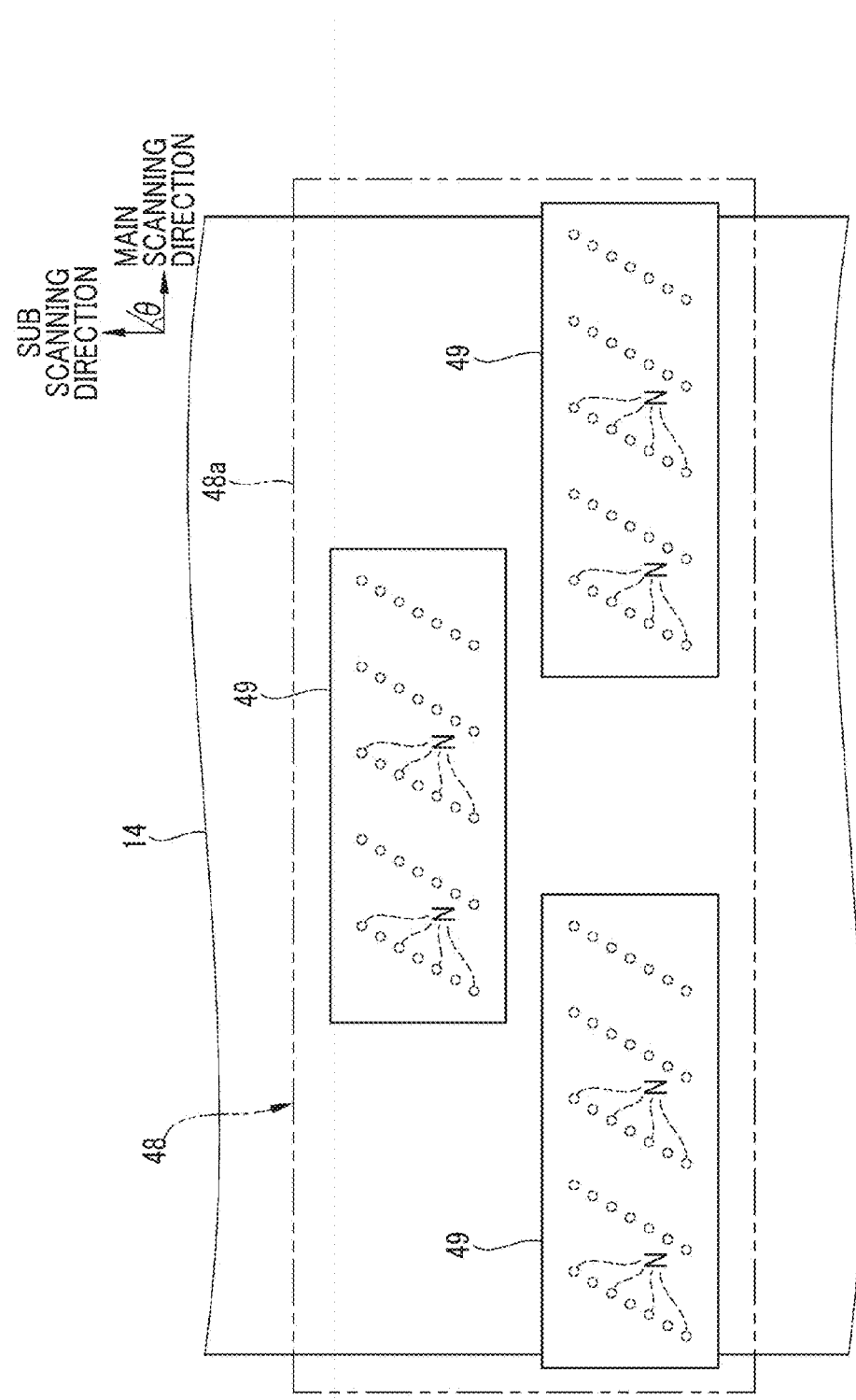
FIG. 2 is a schematic view showing an example of an ink jet head.

FIG. 2 is a schematic view showing an example of each of the ink jet heads 48. As shown in FIG. 2, each of the ink jet heads 48 has a structure in which a plurality of head modules 49 are joined together in one row along the longitudinal direction (main scanning direction) of the ink jet head 48. That is, each of the ink jet heads 48 is a line head having a length corresponding to the width of the recording medium 14 in the main scanning direction.

The ink jet head 48 is provided with a plurality of head modules 49, and a frame body 48a which holds the respective head modules 49. The respective head modules 49 are arranged in a zigzag order along the main scanning direction. The number of head modules 49 is not limited to three, and may be two or four or more. The respective head modules 49 may be joined together in one row along the main scanning direction.

Each of the head modules 49 is a matrix type head which has a plurality of nozzle columns arranged in the main scanning direction, each of the nozzle columns having a plurality of nozzles N (corresponding to recording elements of the invention) arranged along an oblique direction at a given angle θ with respect to the main scanning direction. FIG. 2 is a top view of the ink jet head 48, and shows the nozzles N arranged on the nozzle surface as the lower surface in perspective.

The respective nozzles N of the head module 49 are arranged such that the positions in the main scanning direction are different from one another. Accordingly, the respective nozzles N can be handled equivalently to a case where the nozzles are arranged linearly at a substantially constant pitch in the main scanning direction.

The ink jet heads 48 record a color image on the recording surface of the recording medium 14 coated with the process liquid by ejecting droplets of color ink toward the recording medium 14 transported in rotation by the drawing drum 44. The ink jet heads 48 are single-pass recording heads which record an image on the recording surface of the recording medium 14 by single relative movement in the sub scanning direction with respect to the recording medium 14. The term "relative movement" used herein refers to the recording medium 14 being moved in the sub scanning direction with respect to the stationary ink jet heads 48; however, the ink jet heads 48 may be moved in the sub scanning direction with respect to the stationary recording medium 14. In this embodiment, although image recording is performed using ink of four colors of cyan (C), magenta (M), yellow (Y), and black (K), a combination of ink colors or the number of colors is not limited to this embodiment.

Returning to FIG. 1, an inline sensor 82 is provided on the downstream side of the ink jet heads 48 in the sub scanning direction, and images an image recorded on the recording surface of the recording medium 14 by the ink jet heads 48. Defect of the image recorded on the recording surface of the recording medium 14 is determined based on an imaging signal output from the inline sensor 82. The inline sensor 82 corresponds to an imaging unit of the invention, and reads the image by single relative movement with respect to the recording medium 14. The term "relative movement" used herein refers to the recording medium 14 of the inline sensor 82 and the recording medium 14 being moved in the sub scanning direction with respect to the stationary inline sensor 82; however, the inline sensor 82 may be moved in the sub scanning direction with respect to the stationary recording medium 14. In this embodiment, since the recording medium 14 is moved, pressure drums, such as the drawing drum 44 and a transfer drum 52, correspond to a moving unit of the invention.

The recording medium 14 passing through the imaging area of the inline sensor 82 is transferred to a drying drum 54 through the transfer drum 52, is supported by the outer peripheral surface of the drying drum 54, and is transported in rotation along the outer peripheral surface of the drying drum 54 with the rotation of the drying drum 54.

The recording medium 14 transported in rotation by the drying drum 54 is subjected to drying from a drying device 56. For drying, either heating by a heater or blowing of drying air (hot air) by a fan, or a combination thereof is applied.

The recording medium 14 subjected to drying is transferred to a fixing drum 64 through a transfer drum 62. The recording medium 14 transferred to the fixing drum 64 is held on the outer peripheral surface of the fixing drum 64 and is transported in rotation along the outer peripheral surface of the fixing drum 64 with the rotation of the fixing drum 64.

The image formed on the recording medium 14 transported in rotation by the fixing drum 64 is subjected to heating by a heater 66 and is subjected to pressing by a fixing roller 68.

The recording medium 14 subjected to fixing by the fixing roller 68 is sent to the discharge unit 70. The discharge unit 70 is configured such that the recording medium 14 is transported to a stacker 76 by a chain 74 wrapped around tensioning rollers 72A and 72B.

Figure 3:
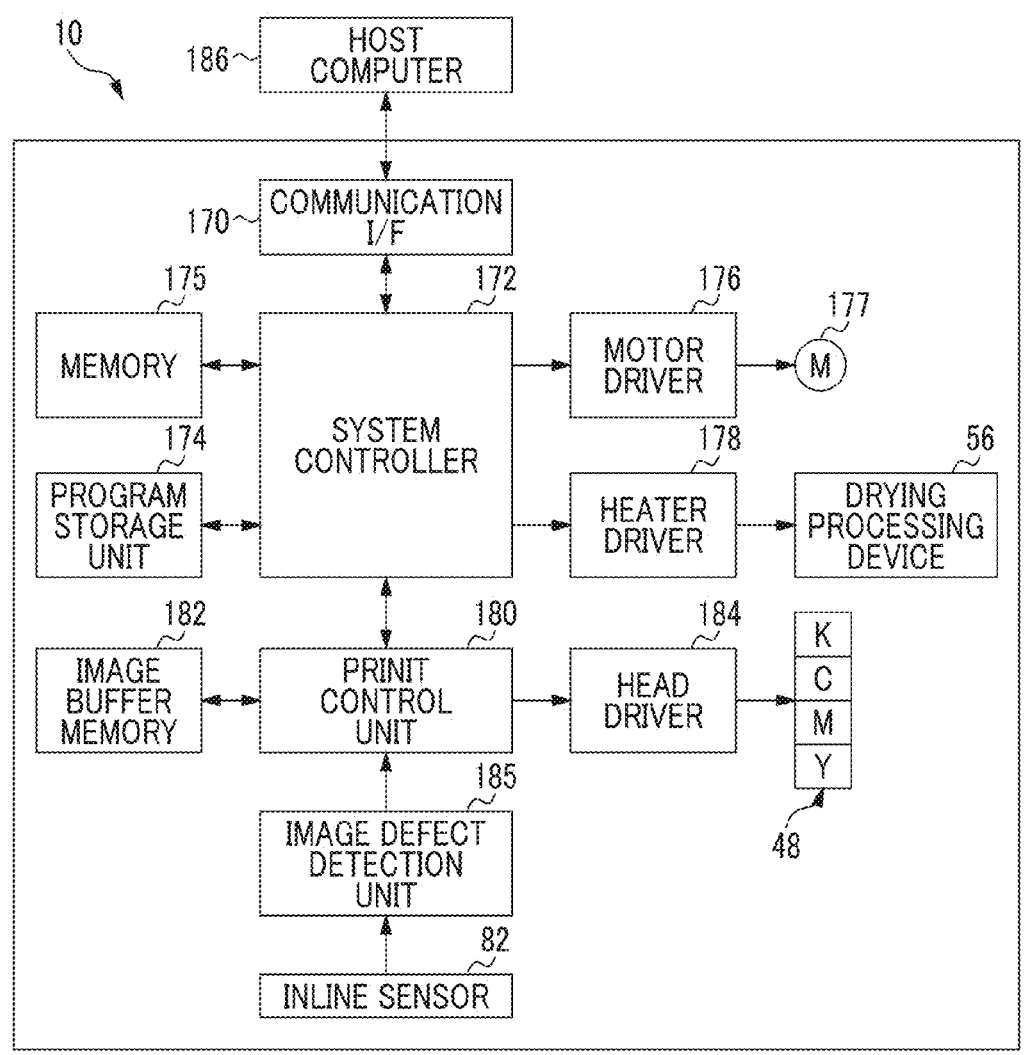
FIG. 3 is a block diagram showing the schematic configuration of a control system of the ink jet recording apparatus.

FIG. 3 is a block diagram showing the schematic configuration of a control system of the ink jet recording apparatus 10. As shown in FIG. 3, the ink jet recording apparatus 10 is provided with a communication interface (I/F) 170, a system controller 172, a program storage unit 174, a memory 175, a motor driver 176, a motor 177, a heater driver 178, a print control unit 180, an image buffer memory 182, a head driver 184, and an image defect detection unit 185, in addition to the ink jet heads 48, the drying device 56, and the inline sensor 82 described above.

The communication I/F 170 is an interface unit which receives raster image data transmitted from a host computer 186. For the communication I/F 170, a serial interface, such as a universal serial bus (USB), or a parallel interface, such as Centronics, may be applied. A buffer memory (not shown) for achieving high-speed communication may be mounted in the communication I/F 170.

The system controller 172 includes a central processing unit and peripheral circuits, and functions as a control device which controls the entire ink jet recording apparatus 10 according to a control program read from the program storage unit 174. The system controller 172 also functions as a calculation device which performs various calculations. For example, the system controller 172 has a signal (image) processing function of performing various kinds of processing and corrections in order to generate a print control signal from image data input from the communication I/F 170, and supplies generated print data to the print control unit 180.

The memory 175 has a function as temporary storage means for temporarily storing image data input from the communication I/F 170, or a function as a development area of various programs stored in the program storage unit 174 and a calculation work area for the CPU. As the memory 175, a volatile memory which is readable and writable in serial is used.

The motor driver 176 controls the driving of the motor 177 which rotationally drives a pressure drum related to transporting the recording medium 14, such as the drawing drum 44 or the transfer drum 52, under the control of the system controller 172. That is, the motor driver 176 controls the transport timing and transport speed of the recording medium 14.

The heater driver 178 controls the temperature of the heater of the drying device 56 or the heater 66 (not shown in FIG. 3) under the control of the system controller 172.

The print control unit 180 integrally controls image recording on the recording medium 14 by the ink jet heads 48. The print control unit 180 stores print data for one page input from the system controller 172 or print data for a plurality of lines in one page in the image buffer memory 182. The print control unit 180 reads print data for single droplet ejection from the image buffer memory 182 and transfers print data to the head driver 184.

The print control unit 180 performs control such that the ink jet heads 48 record a test chart 87 (see (A) of FIG. 6, corresponding to an image of the invention) for image defect detection on the recording medium 14 at the timing of detecting image defect, such as stripe unevenness or scratched, included in the image recorded on the recording medium 14 under the control of the system controller 172. The timing of detecting image defect is, for example, at the time of starting of the ink jet recording apparatus 10, after the replacement of the ink jet heads 48, after image recording of a predetermined number of sheets, after a given period has elapsed, or the like. The test chart 87 is, for example, an image having a uniform density pattern (solid pattern).

The head driver 184 ejects ink droplets from the ink jet heads 48 based on print data input from the print control unit 180. The image is formed on the recording surface of the recording medium 14 by controlling the ejection of ink droplets from the ink jet heads 48 in synchronization with the transport speed of the recording medium 14.

The image defect detection unit 185 corresponds to a detection unit of the invention, and constitutes an image defect detection device of the invention along with the inline sensor 82 described below. The image defect detection unit 185 detects image defect, such as stripe unevenness or scratches, included in the image recorded on the recording medium 14 based on the imaging signal (corresponding to the reading result of the invention) input from the inline sensor 82.

<Configuration of Inline Sensor>

Figure 4:
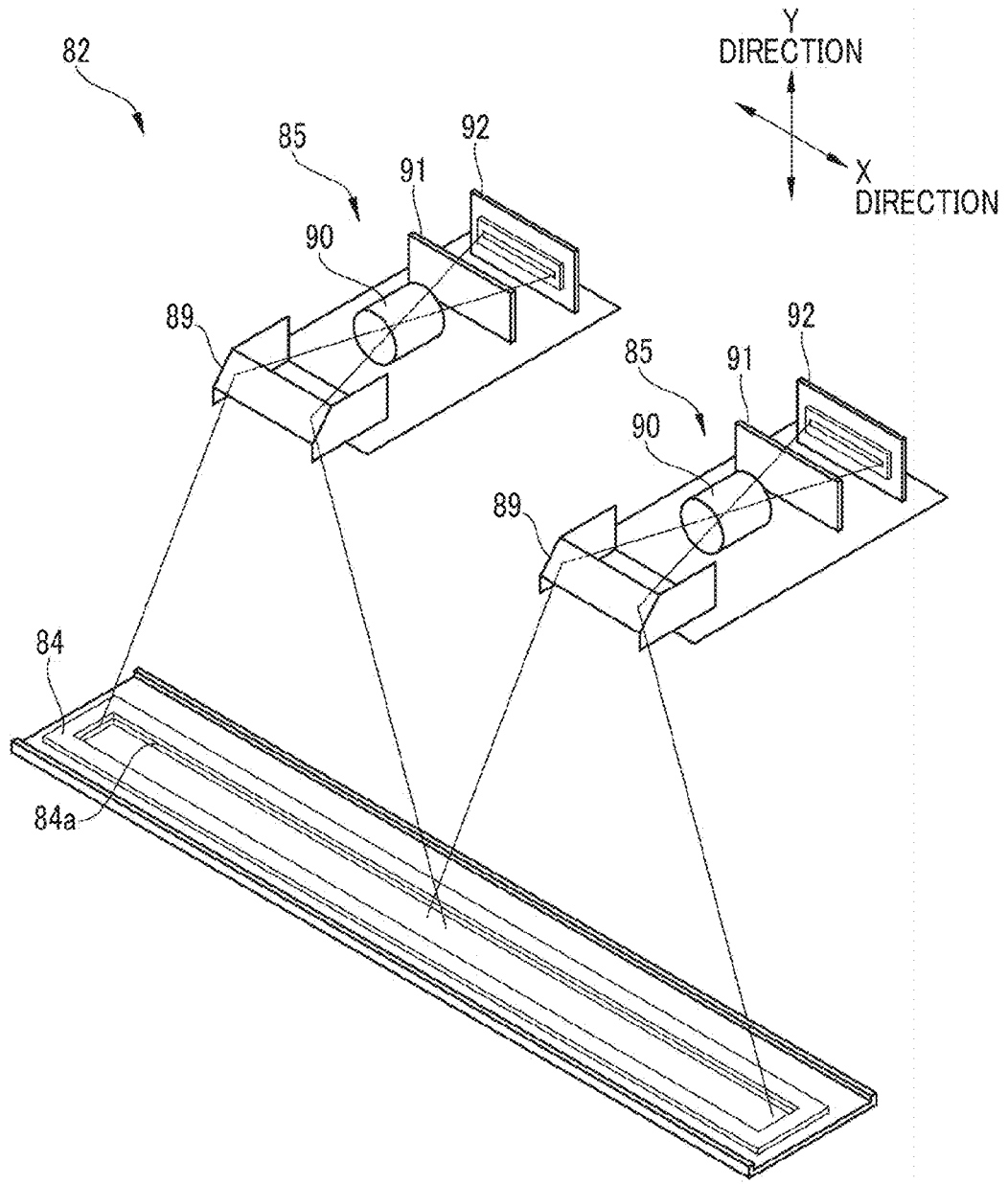
FIG. 4 is a perspective view showing the schematic configuration of an inline sensor.

FIG. 4 is a perspective view showing the schematic configuration of the inline sensor 82. As shown in FIG. 4, the inline sensor 82 is provided with a slit plate 84, two imaging units 85, and a sensor body (not shown) which accommodates the slit plate 84 and the imaging units 85. An X direction in the drawing is a direction parallel to the above-described main scanning direction, and corresponds to a second direction of the invention intersecting (in this embodiment, orthogonal to) the sub scanning direction. A Y direction in the drawing is a direction orthogonal to the X direction, and specifically, is a direction different from the sub scanning direction as described below. In this embodiment, although the X direction is orthogonal to the sub scanning direction and the Y direction, the term "orthogonal" used herein includes substantially orthogonal.

The slit plate 84 is disposed at a position opposed to the recording surface of the recording medium 14 after image recording by the ink jet heads 48, and has a shape extended in the X direction. In the slit plate 84, a slit opening 84a having a shape extended in the X direction longer than the width (the length in the X direction) of the recording medium 14 is formed.

The imaging units 85 are disposed on the slit plate 84, and image the image recorded on the recording surface of the recording medium 14, for example, the test chart 87 (see (A) of FIG. 6) through the slit opening 84a. The two imaging units 85 are disposed in parallel in the X direction, and image the entire area of the width of the recording medium 14. The number of imaging units 85 disposed is not particularly limited as long as the entire area of the width of the recording medium 14 can be imaged. The number of imaging units 85 disposed may be appropriately increased or decreased according to the magnitude of the imaging range (visual field) of the imaging units 85.

Figure 5A:
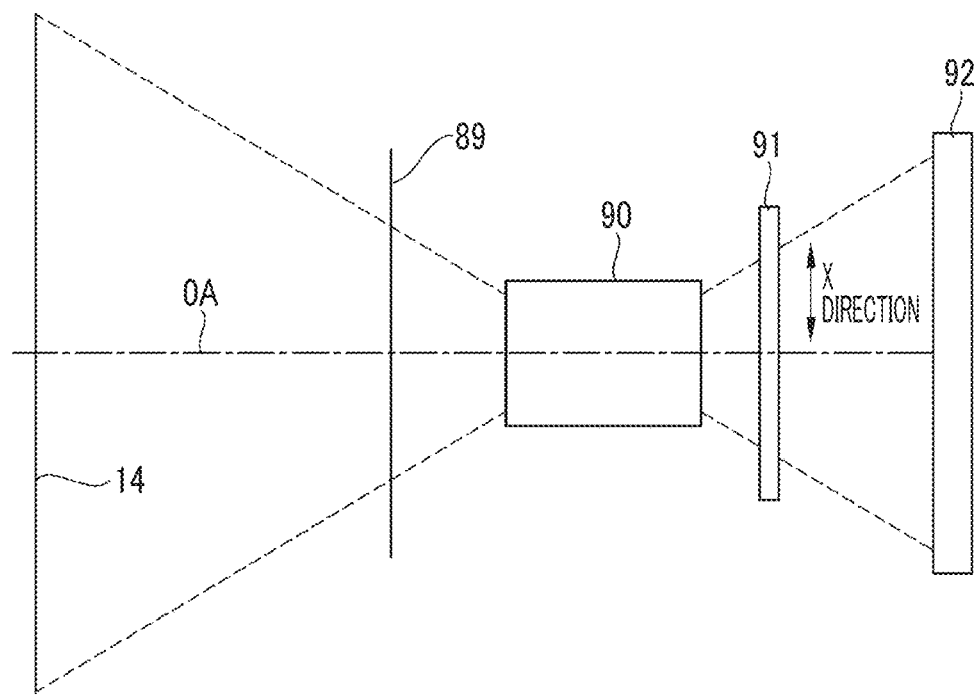
FIG. 5A is a top view of an imaging unit.
Figure 5B:
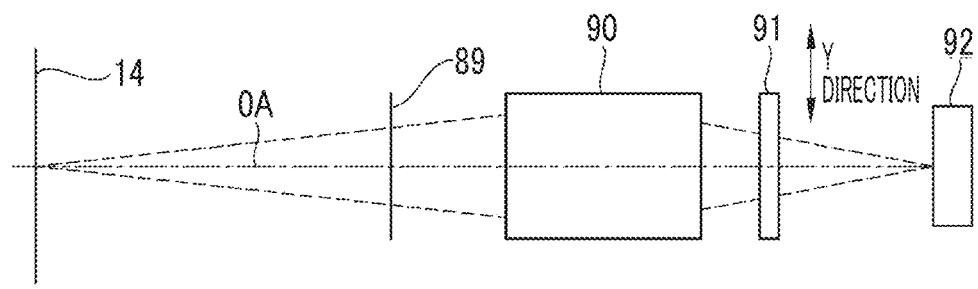
FIG. 5B is a side view of an imaging unit.

FIG. 5A is a top view of each of the imaging units 85, and FIG. 5B is a side view of each of the imaging units 85. As shown in FIGS. 4, 5A, and 5B, each of the imaging units 85 includes a mirror 89, a lens 90, a birefringent plate 91, and an image sensor 92 disposed in one row in a direction perpendicular to both of the X direction and the Y direction. In FIGS. 5A and 5B, the slit plate 84 is omitted.

The mirror 89 and the lens 90 correspond to an optical system of the invention, and guide image light of the test chart 87 transmitted through the slit opening 84a to the image sensor 92. Specifically, the mirror 89 reflects image light of the test chart 87 toward the lens 90. The lens 90 is a reduction optical system, and reduces image light of the test chart 87 incident on the imaging surface of the image sensor 92 according to the size of the imaging surface. Reference numeral "OA" in the drawing represents the optical axis of image light.

The birefringent plate 91 is disposed near the lens 90, and shifts and duplexes image light of the test chart 87 at least in the X direction by performing birefringence of image light of the test chart 87 incident on the imaging surface of the image sensor 92. With this, image light of the test chart 87 on the read pixels of the image sensor 92 described below is duplexed. At this time, the direction of shifting image light of the test chart 87 is not limited to a direction completely parallel to the X direction, and may be a direction substantially parallel to the X direction. As the birefringent plate 91, crystal having birefringence, such as quartz or calcite, or an optical low-pass filter commercially available from KYOCERA Corporation or the like may be used. A shift amount of image light of the test chart 87 in the X direction by the birefringent plate 91 will be described.

In this embodiment, although the birefringent plate 91 is disposed near the lens 90 in order to decrease the size (area) of the birefringent plate 91 and to suppress an increase in cost, the position of the birefringent plate 91 may be appropriately changed. The birefringent plate 91 may be disposed between the mirror 89 and the lens 90.

The image sensor 92 corresponds to an image reading unit of the invention, and images image light of the test chart 87 incident through the birefringent plate 91 and the like, that is, reads the test chart 87 recorded on the recording medium 14. Since image light incident on the imaging surface of the image sensor 92 is duplexed by birefringence in the birefringent plate 91, the image sensor 92 images the duplexed image light of the test chart 87. As the image sensor 92, for example, a charge coupled device (CCD) image sensor is used, and a complementary metal oxide semiconductor (CMOS) image sensor may be used.

The image sensor 92 is a line sensor having a shape extended in the X direction, and has a plurality of read pixels 92a (see (A) of FIG. 6) arranged in the X direction on the imaging surface. The pixel pitch of the read pixels 92a in the X direction is not particularly limited, and in this embodiment, is about 53 μm. A channel stop (not shown) incapable of detecting image light is formed between adjacent read pixels 92a.

<Control of Shift Amount in X Direction by Birefringent Plate>

FIG. 6 is a schematic view of image light of the test chart 87 incident on the read pixels 92a of the image sensor 92 when the birefringent plate 91 is not disposed (A) or through the birefringent plate 91 (B).

As shown in (A) of FIG. 6, in the comparatively inexpensive and low resolution (resolution lower than recording density by the ink jet heads 48) image sensor 92, the width of an image of image defect 100 in the X direction is narrower than the pitch of the read pixels 92a, and the image defect 100 may not be detected depending on the positional relationship between the image defect 100 and the read pixels 92a. For this reason, as shown in (B) of FIG. 6, the birefringent plate 91 shifts and duplexes image light of the test chart 87 at least in the X direction, thereby making the width of the image of the image defect 100, such as stripe unevenness or scratches, in the X direction extended in the sub scanning direction on the read pixels 92a greater than the pitch of the read pixels 92a.

The image defect 100 extended in the sub scanning direction on the recording surface of the recording medium 14 has a shape extended in the Y direction on the read pixels 92a. That is, in this embodiment, although the sub scanning direction and the Y direction are different directions from each other, both represent the extension direction of the image defect 100. The image defect 100 has a feature in that the substantially entire portion thereof is present alone, even if present, several image defects are present in one image (one page), and the image defect 100 does not have a periodic structure. Accordingly, the width of the image of the image defect 100 in the X direction is magnitude depending on the pitch of the read pixels 92a of the image sensor 92.

Hereinafter, when the width of the image of the image defect 100 in the X direction on the read pixels 92a when the birefringent plate 91 is not disposed is W, the pitch of the read pixels 92a is P, and the shift amount of image light of the test chart 87 in the X direction by the birefringent plate 91 is d, a case where P≥W is satisfied will be described as an example. In this case, when the birefringent plate 91 expands the width of the image of the image defect 100 in the X direction on the read pixels 92a from W to WA represented by Expression (1) by duplexing image light of the test chart 87, image light of the test chart 87 is shifted at least in the X direction by d, which satisfies Expressions (2) and (3).

$$WA = W + d \quad (1)$$

$$d < W \quad (2)$$

$$WA > P \quad (3)$$

If the shift amount d is greater than the width W, the image of the duplexed image defect 100 is separated. Accordingly, the image defect 100 cannot be detected depending on the positional relationship between the image defect 100 and the read pixels 92a. For this reason, the shift amount d is adjusted so as to satisfy Expression (2). In this way, the shift amount d is adjusted such that the width WA is wider than the pitch P within a range, in which the image of the duplexed image defect 100 is not separated, based on Expressions (2) and (3).

It is preferable that the shift amount d which satisfies Expressions (2) and (3) is d which satisfies Expression (4).

$$d/P = 0.5 \pm 0.2 \quad (4)$$

This is because, if the value of the shift amount d is too small, the magnitude of the width WA is substantially equal to the width W before duplexing, and thus image duplexing becomes meaningless. On the contrary, if the value of the shift amount d is too large (in particular, the shift amount d is an integer multiple of the pitch P), as described above, the image of the image defect 100 is separated and the image defect 100 cannot be detected. Accordingly, the shift amount d is preferably about ½ of the pitch P, and in this embodiment, is adjusted within a range satisfying Expression (4).

Figure 7A:
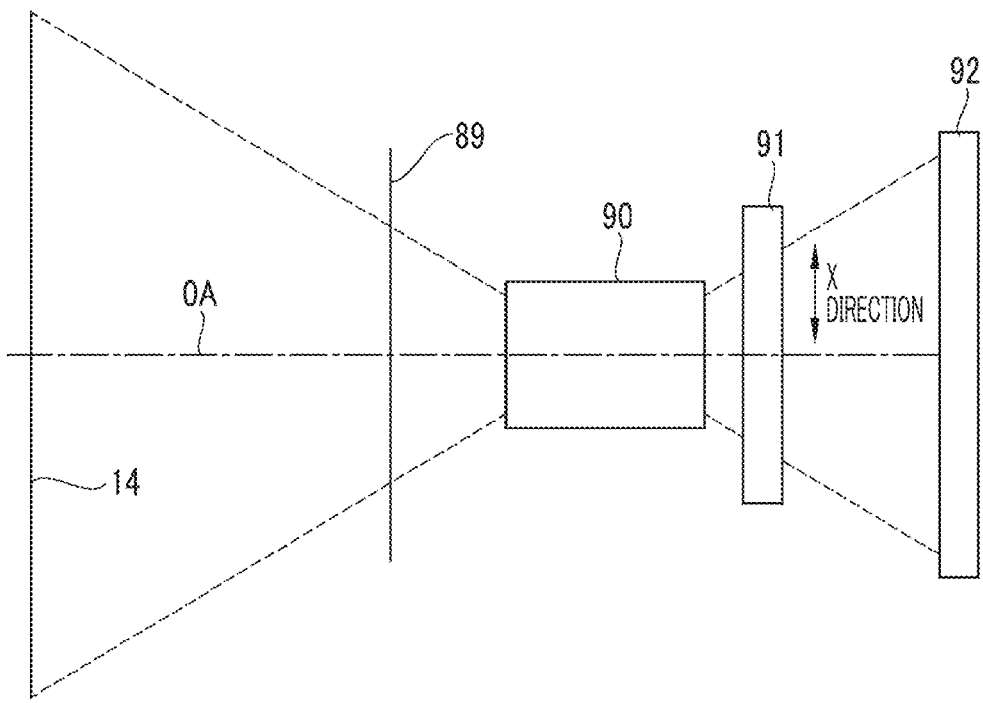
FIGS. 7A and 7B are explanatory views illustrating an adjustment method of a shift amount.
Figure 7B:
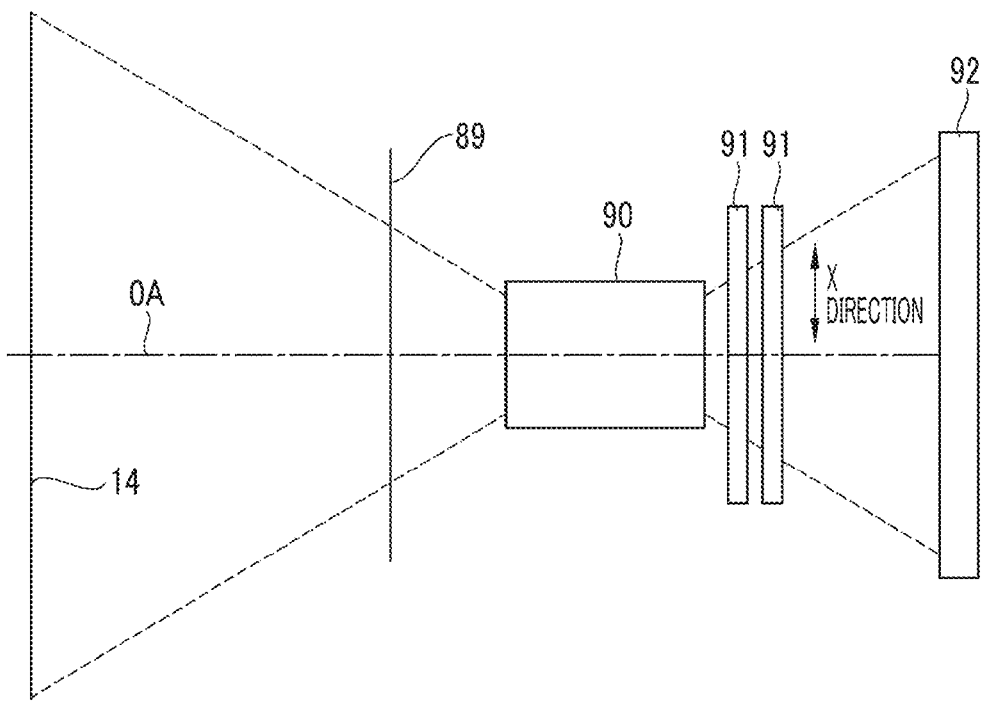
Figure 8:
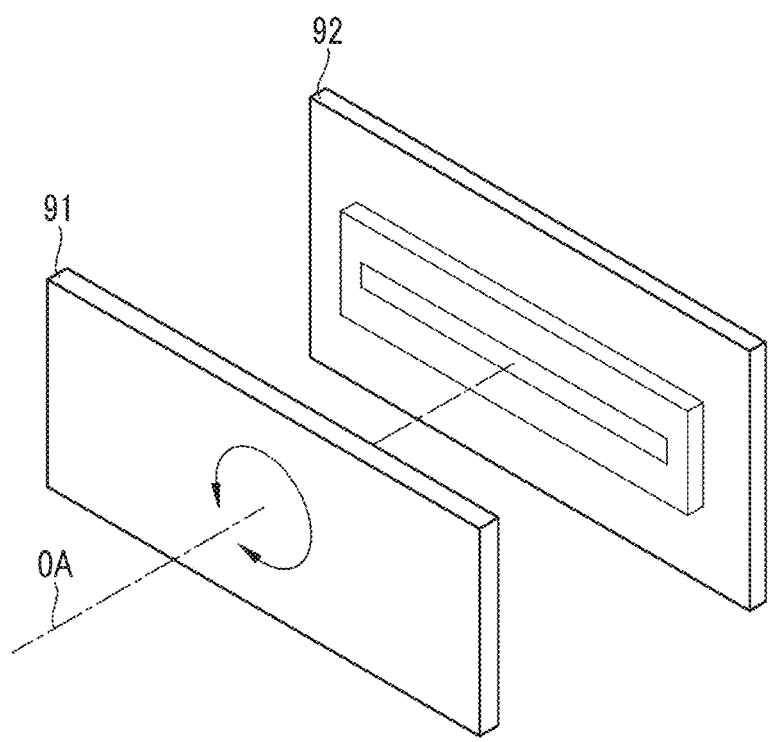
FIG. 8 is an explanatory view illustrating another embodiment of an adjustment method of a shift amount.

FIGS. 7A and 7B are explanatory views illustrating an adjustment method of the shift amount d. FIG. 8 is an explanatory view illustrating another embodiment of an adjustment method of the shift amount d. The magnitude of the shift amount d can be controlled by adjusting the thickness of the birefringent plate 91 as shown in FIG. 7A, or by adjusting the number of birefringent plates 91 as shown in FIG. 7B. For example, if the refractive indexes of the birefringent plate 91 to an ordinary light beam and an extraordinary light beam are respectively $n_o$ and $n_e$, a shift amount D of an image of the test chart 87 subjected to birefringence in the birefringent plate 91 having a thickness t is expressed by Expression (5).

$$D = t \cdot (n_e^2 - n_o^2)/(n_e^2 + n_o^2) \cong t \cdot (n_e^2 - n_o^2)/(2 \cdot n_e \cdot n_o) \tag{5}$$

A shift component in the X direction of the shift amount D becomes the above-described shift amount d.

When quartz is used as the birefringent plate 91, $n_o = 1.5443$ and $n_e = 1.5534$. Accordingly, Expression (5) becomes Expression (6).

$$D \text{ (mm)} \cong 5.9 \times 10^{-3} \cdot t \text{ (mm)} \tag{6}$$

The shift direction of the shift amount D matches the X direction based on Expression (6), and then, the thickness of the birefringent plate 91 or the number of birefringent plates 91 is adjusted, whereby it is possible to adjust the above-described shift amount d to a desired value within the range of Expression (4).

As shown in FIG. 8, the shift amount d is also adjustable by the angle (also referred to an in-plane rotation angle or direction) θ of the birefringent plate 91 within a plane perpendicular to the optical axis OA of image light (within a plane perpendicular to the X direction and the Y direction). Specifically, if the shift amount d is maximal ($=d_{max}$) when θ=0 (that is, the crystal axis of the birefringent plate 91 is parallel to the X direction), the shift amount d in the X direction is expressed by Expression (7).

$$d = d_{max} \times \cos \theta \tag{7}$$

When adjusting the angle of the birefringent plate 91, a shift of the image of the test chart 87 (image defect 100) occurs in the Y direction as well as the X direction; however, since the image defect 100 on the read pixels 92a has a directional shape extended in the Y direction, a shift in the Y direction is negligible.

In this way, it is possible to adjust the shift amount d by adjusting the thickness of the birefringent plate 91, the number of birefringent plates 91, and the angle of the birefringent plate 91. For example, if an optimum shift amount d when the pitch P of the read pixels 92a of the image sensor 92 corresponds to 480 dpi (≅53 μm) is 32 μm, in order to implement d=32 μm as the shift amount d, the thickness t of the birefringent plate 91 may be set to t=5.4 mm under the condition of θ=0.

<Imaging Signal of Image Sensor>

Figure 9:
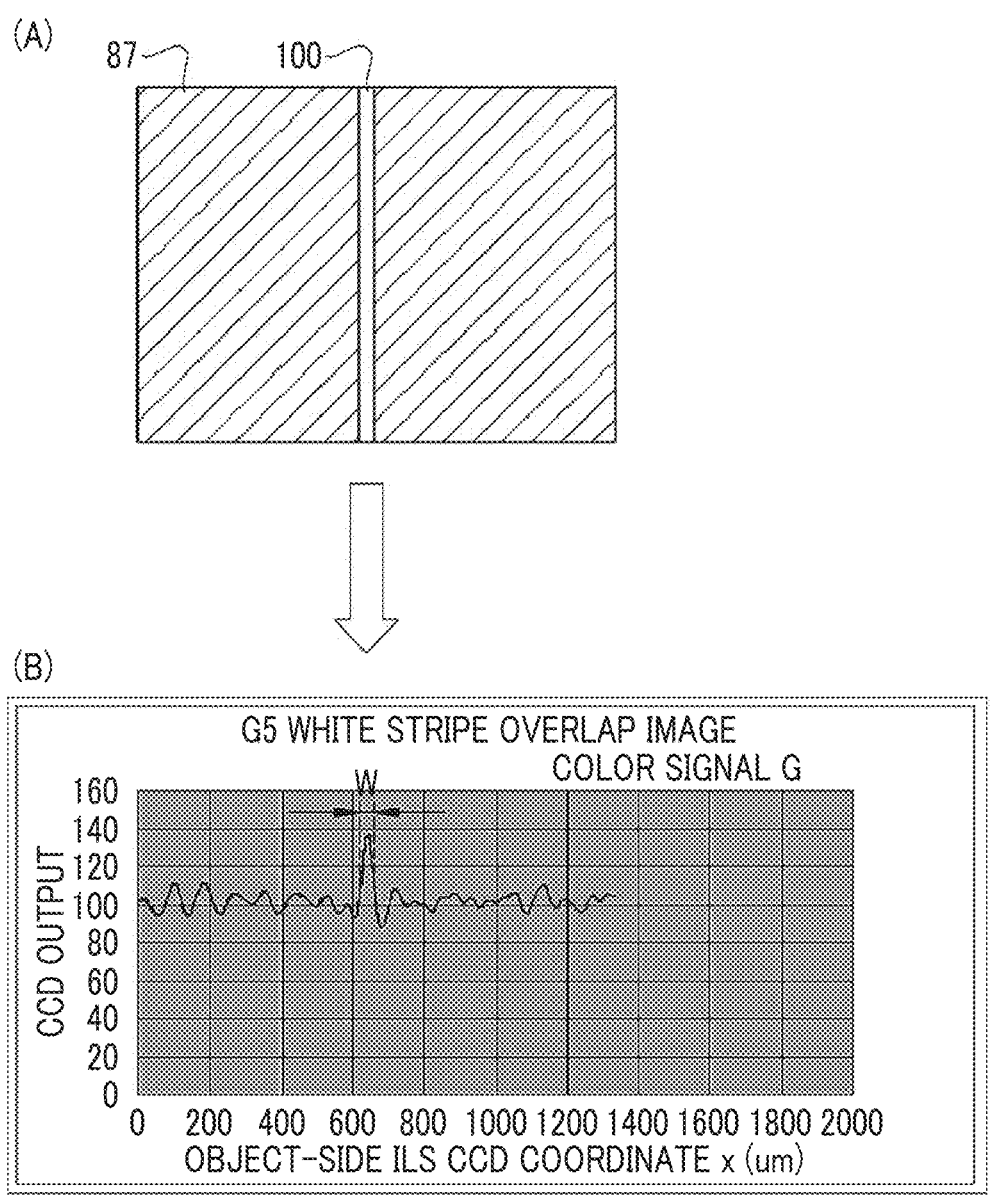
FIG. 9 is an explanatory view illustrating a simulation result of an imaging signal of an image sensor obtained when a birefringent plate is not disposed.
Figure 10:
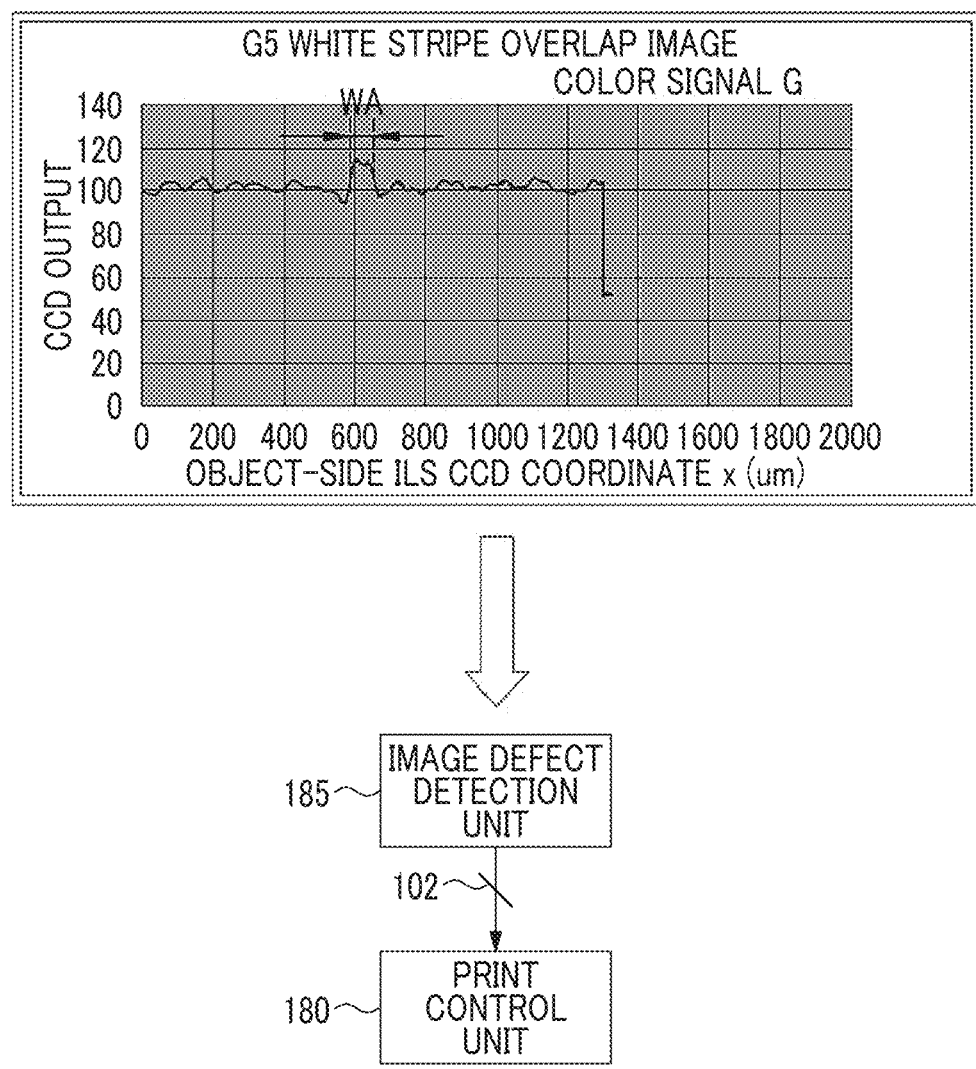
FIG. 10 is an explanatory view illustrating a simulation result of an imaging signal of an image sensor obtained through a birefringent plate.

(A) and (B) of FIGS. 9 are explanatory views illustrating an imaging signal (corresponding to a reading result of an image of the invention) of the image sensor 92 obtained when the birefringent plate 91 is not disposed. FIG. 10 is an explanatory view illustrating an imaging signal of the image sensor 92 obtained through the birefringent plate 91.

As shown in (A) of FIG. 9, if a test chart 87 including image defect 100 of a width in the X direction of 50 to 60 μm is imaged by the image sensor 92 in a state where the birefringent plate 91 is not disposed, as shown in (B) of FIG. 9, a peak of a narrow width (width W) corresponding to the image defect 100 is generated in an imaging signal obtained by the image sensor 92.

As shown in FIG. 10, if the same test chart 87 is imaged by the image sensor 92 through the birefringent plate 91, a peak which corresponds to the image defect 100 and has a width (width WA) wider than when the birefringent plate 91 is not disposed is generated in an imaging signal obtained by the image sensor 92. That is, it is possible to expand the width of the peak included in the imaging signal of the image sensor 92 by duplexing the image of the test chart 87 (image defect 100) in the X direction using the birefringent plate 91.

The image defect detection unit 185 analyzes the imaging signal input from the image sensor 92, and when the peak corresponding to the image defect 100 is included in the imaging signal, outputs detection information 102 including the position of the read pixel 92a corresponding to the peak to the print control unit 180. When the image defect 100 is not generated, detection information 102 indicating no image defect is output from the image defect detection unit 185 to the print control unit 180. The detection information 102 is stored in the memory 175 or the like from the print control unit 180 through the system controller 172. The system controller 172 reads the detection information 102 from the memory 175 and displays the detection information 102 on a monitor (not shown) or the like. With this, it is possible to determine the presence or absence of the occurrence of the image defect 100, the position of the image defect 100 on the recording medium 14, the number of the nozzle N corresponding to the image defect 100, and the like.

<Operation of Ink Jet Recording Apparatus>

Figure 11:
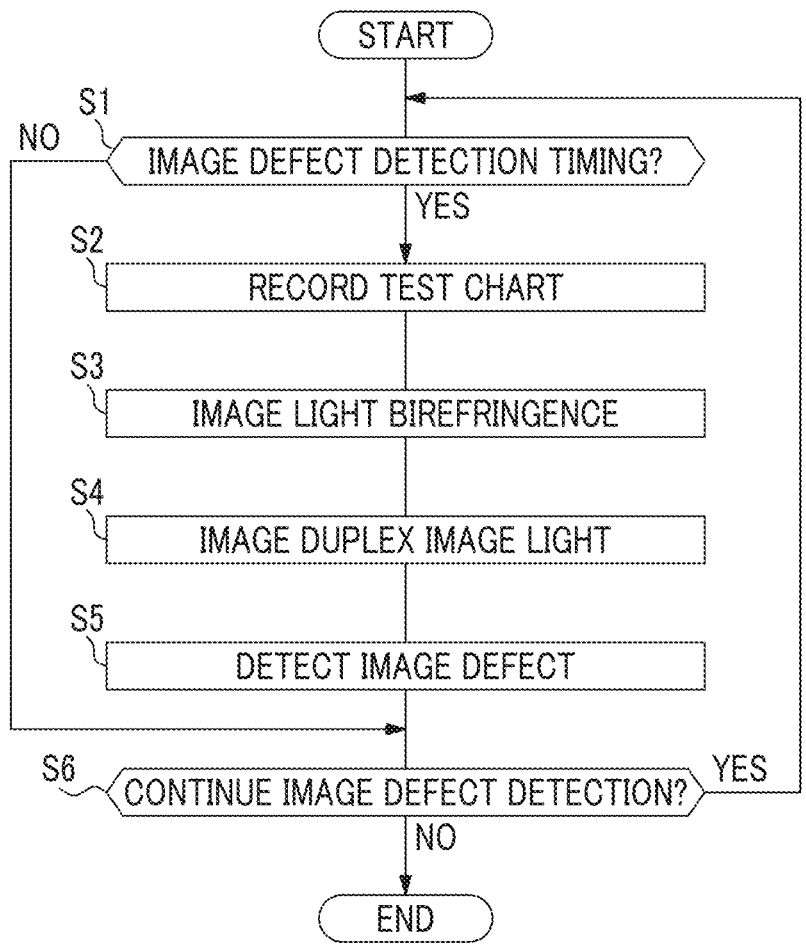
FIG. 11 is a flowchart showing the flow of an image defect detection process.
Figure 12A:
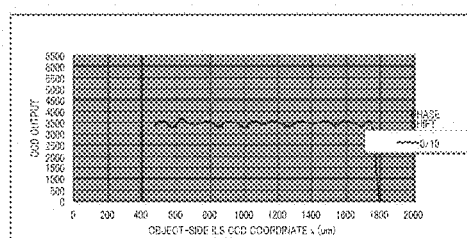
FIGS. 12A to 12J are explanatory views illustrating an imaging signal of a comparative example obtained by imaging an image of a test chart with an image sensor when a birefringent plate is not disposed.
Figure 12B:
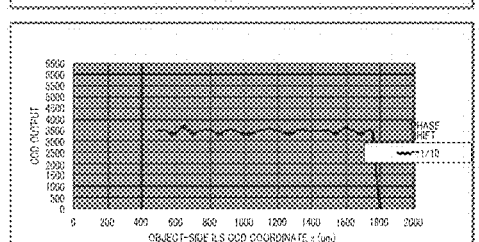
Figure 12C:
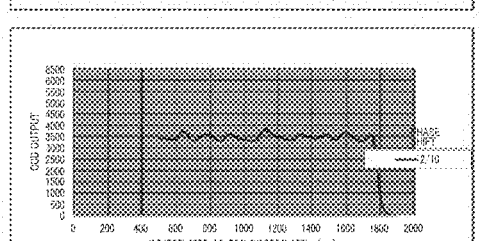
Figure 12D:
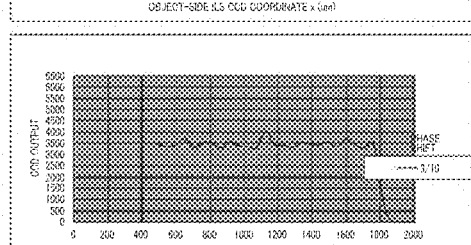
Figure 12E:
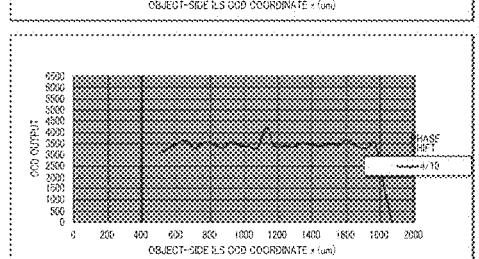
Figure 12F:
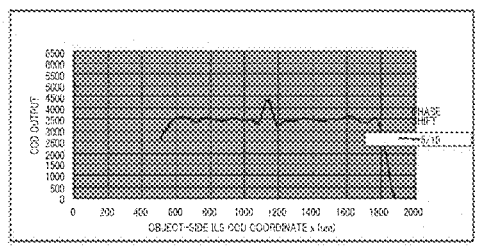
Figure 12G:
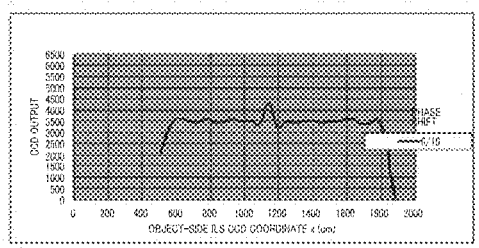
Figure 12H:
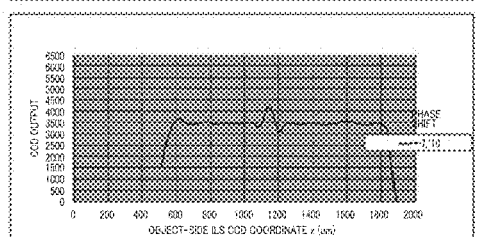
Figure 12I:
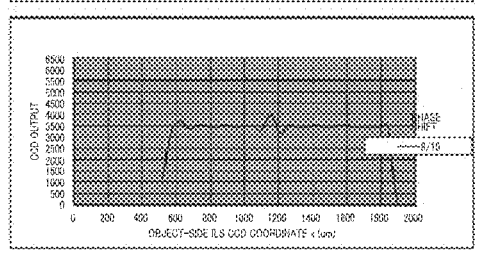
Figure 12J:
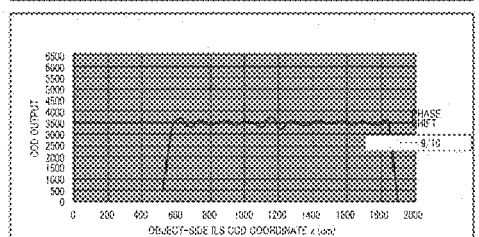
Figure 13A:
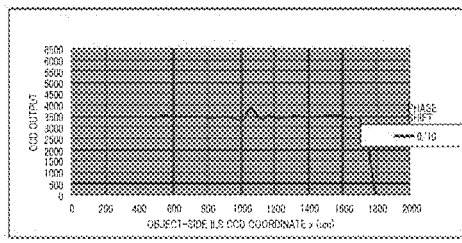
FIGS. 13A to 13J are explanatory views illustrating an imaging signal obtained by imaging an image of a test chart with an image sensor in the configuration of the invention in which a birefringent plate is disposed.
Figure 13B:
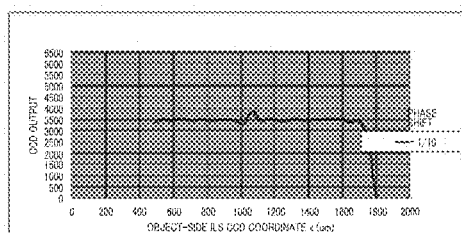
Figure 13C:
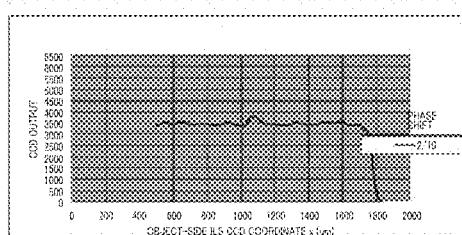
Figure 13D:
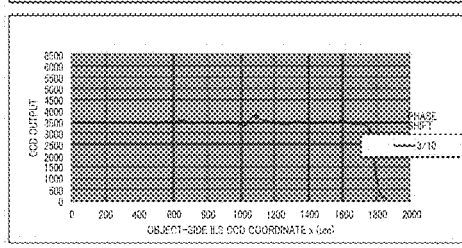
Figure 13E:
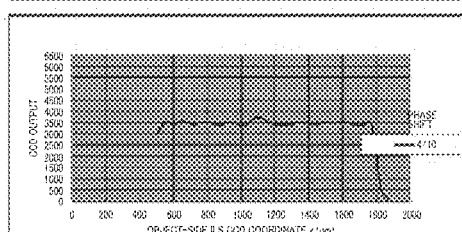
Figure 13F:
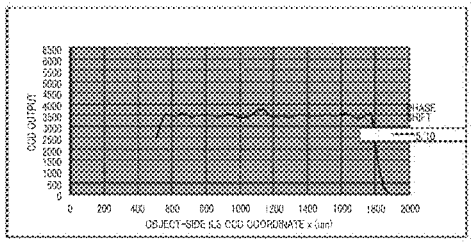
Figure 13G:
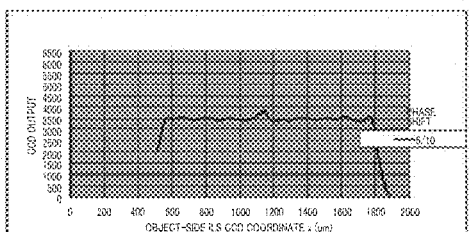
Figure 13H:
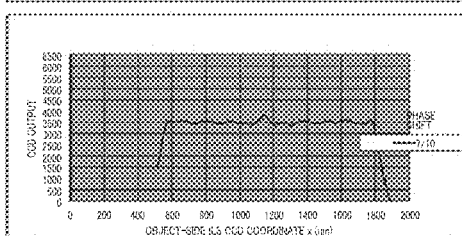
Figure 13I:
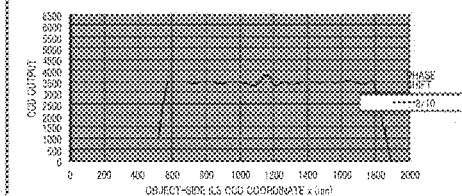
Figure 13J:
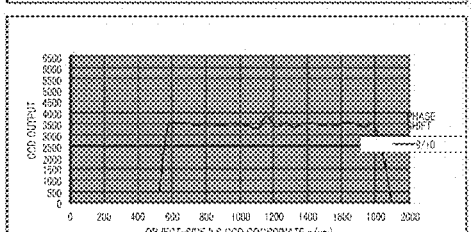

Next, the operation of the ink jet recording apparatus 10 configured as above, and in particular, a detection process (an image defect detection method of the invention) of the image defect 100 will be described referring to FIG. 11. FIG. 11 is a flowchart showing the flow of the detection process of the image defect 100.

The system controller 172 of the ink jet recording apparatus 10 performs control such that the print control unit 180 records the test chart 87 at the timing of detecting predetermined image defect, such as at the time of starting of the ink jet recording apparatus 10, after the replacement of the ink jet heads 48, after image recording of a predetermined number of sheets, or after a given period has elapsed (in Step S1, YES). The system controller 172 performs control such that the motor driver 176 drives the motor 177 to transport the recording medium 14, and the print control unit 180 performs control such that the head driver 184 ejects ink droplets from the ink jet heads 48 in synchronization with the transport of the recording medium 14. With this, the test chart 87 is recorded on the recording surface of the recording medium 14 (Step S2).

The recording medium 14 having the test chart 87 recorded thereon is subsequently transported toward the downstream side in the sub scanning direction and passes through the inline sensor 82. At this time, image light of the test chart 87 is incident on the image sensor 92 through the slit opening 84a, the mirror 89, the lens 90, and the birefringent plate 91.

Image light of the test chart 87 incident on the imaging surface of the image sensor 92 through the lens 90 is shifted and duplexed at least in the X direction by birefringence in the birefringent plate 91 (Step S3, corresponding to a birefringence step of the invention). With this, image light of the test chart 87 duplexed through the birefringent plate 91 is incident on the imaging surface of the image sensor 92. The duplexed image light of the test chart 87 is imaged by the image sensor 92 (Step S4, corresponding to an image reading step of the invention).

At this time, the image of the image defect 100 included in the test chart 87 is shifted by the shift amount d in the X direction by birefringence in the birefringent plate 91. As a result, the width of the image of the image defect 100 in the X direction on the read pixels 92a is expanded from the width W to the width WA. The image sensor 92 outputs an imaging signal obtained by imaging image light of the test chart 87 to the image defect detection unit 185.

The image defect detection unit 185 analyzes the imaging signal input from the image sensor 92 and detects the presence or absence of the image defect 100 in the test chart 87 based on whether or not the peak corresponding to the image defect 100 shown in FIG. 10 is included in the imaging signal (Step S5, corresponding to a detection step of the invention). When the peak corresponding to the image defect 100 is included in the imaging signal, the image defect detection unit 185 outputs the detection information 102 including the position of the read pixel 92a corresponding to the peak to the print control unit 180. When the peak corresponding to the image defect 100 is not included in the imaging signal, the image defect detection unit 185 outputs the detection information 102 indicating no peak to the print control unit 180.

The detection information 102 is stored in the memory 175 or the like from the print control unit 180 through the system controller 172. The detection information 102 is read from the memory 175 by the system controller 172 and is displayed on the monitor (not shown) or the like. With this, it is possible to allow the user to determine the presence or absence of the image defect 100, and when the image defect 100 is present, to determine the position of the image defect 100 on the recording medium 14, the number of the nozzle N corresponding to the image defect 100, and the like.

Hereinafter, the detection of the image defect 100 from Step 51 to Step S5 is repeatedly executed at every timing of detecting image defect, or according to an instruction from the user (in Step S6, YES).

Effects of This Embodiment

As described above, in this embodiment, image light of the test chart 87 incident on the imaging surface of the image sensor 92 is shifted and duplexed at least in the X direction by birefringence in the birefringent plate 91. Therefore, it is possible to expand the width of the image of the image defect 100 in the X direction on the read pixels 92a from the width W to the width WA. As a result, it is possible to detect the image defect 100 without depending on the positional relationship between the image defect 100 and the read pixels 92a.

FIGS. 12A to 12J are explanatory views illustrating a simulation result of an imaging signal of a comparative example obtained by imaging the image of the test chart 87 by the image sensor 92 when the birefringent plate 91 is not disposed. The image sensor 92 performs reading with 480 dpi. The pitch P of the read pixels 92a is 53 µm. In this comparative example, the position of the image of the test chart 87 on the imaging surface of the image sensor 92 is shifted in the X direction from 1/10 to 9/10 by 1/10 (≅5.3 µm) of the pitch P (=53 µm) of the read pixels 92a, the image of the test chart 87 is imaged at each position by the image sensor 92, and an imaging signal of each position (phase shift) is obtained.

As shown in FIGS. 12A to 12J, in the comparative example, a peak corresponding to the image defect 100 may not appear in the imaging signal at a certain position (phase) (refer to the positions of 0/10 and 1/10). That is, the image defect 100 may not be detected.

In contrast, FIGS. 13A to 13J are explanatory views illustrating a simulation result of an imaging signal obtained by imaging the image of the test chart 87 by the image sensor 92 (480 dpi, P–53 µm) in the configuration of the invention in which the birefringent plate 91 is disposed. Similarly to the comparative example, the position of the image of the test chart 87 on the imaging surface of the image sensor 92 is shifted in the X direction from 1/10 to 9/10 by 1/10 of the pitch P of the read pixels 92a, the image of the test chart 87 is imaged at each position by the image sensor 92, and an imaging signal of each position (phase shift) is obtained.

As shown in FIGS. 13A to 13J, in the invention, the peak corresponding to the image defect 100 appears in the imaging signal at any position (phase). Therefore, it is possible to reliably detect the image defect 100.

As described above, in the invention, the width of the image of the image defect 100 in the X direction on the read pixels 92a is expanded by the birefringent plate 91, whereby it is possible to reliably detect image defect even if the inline sensor 82 having the comparatively inexpensive and low resolution image sensor 92 is used. The inline sensor 82 of the invention may be constituted by adding the birefringent plate 91 to a conventional inline sensor, whereby it is possible to implement low cost.

Ink Jet Recording Apparatus of Second Embodiment

Figure 14:
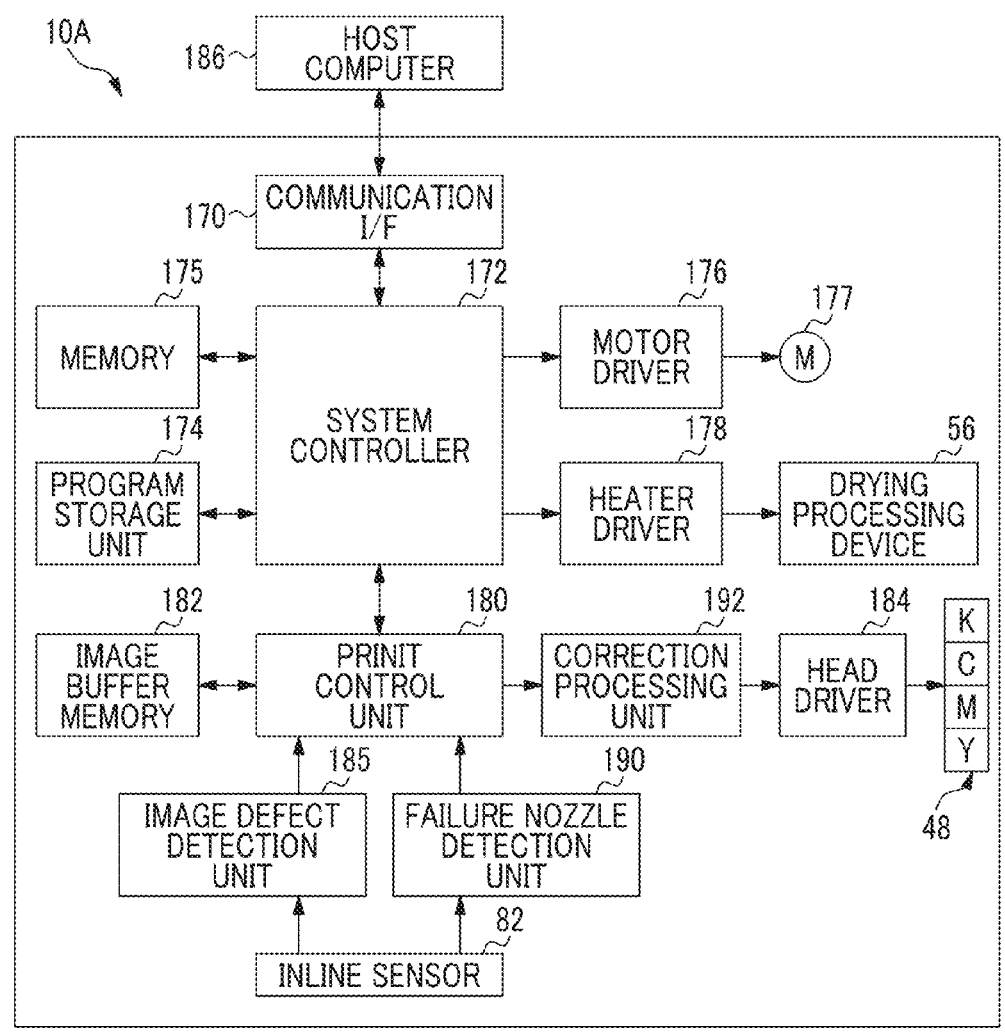
FIG. 14 is a block diagram showing the schematic configuration of a control system of an ink jet recording apparatus according to a second embodiment of the invention.

FIG. 14 is a block diagram showing the schematic configuration of a control system of an ink jet recording apparatus 10A according to a second embodiment of the invention. In the ink jet recording apparatus 10 of the first embodiment, the image defect 100 is detected using the inline sensor 82. In contrast, the ink jet recording apparatus 10A of the second embodiment detects a failure nozzle other than the image defect 100 using the inline sensor 82 and performs a non-ejection correction process based on the detection result.

As shown in FIG. 14, the ink jet recording apparatus 10A basically has the same configuration as the ink jet recording apparatus 10 of the first embodiment, except that a non-failure nozzle detection unit 190 and a correction processing unit 192 are provided. For this reason, the parts having the same functions and configurations as those in the first embodiment are represented by the same reference numerals, and description thereof will not be repeated.

The print control unit 180 of the second embodiment performs control such that the ink jet heads 48 record a test chart 87A for failure nozzle detection on the recording medium 14 at the time of detecting a failure nozzle under the control of the system controller 172. The timing of detecting a failure nozzle is, for example, at the time of starting of the ink jet recording apparatus 10, after the replacement of the ink jet heads 48, after image recording of a predetermined number of sheets, after a given period has elapsed, or the like, and may be identical to or different from the timing of detecting the image defect 100.

FIG. 15 is a schematic view of the test chart 87A for failure nozzle detection. As shown in FIG. 15, the test chart 87A is constituted by line patterns 196 recorded on the recording medium 14 by the respective nozzles N of the ink jet heads 48. In the test chart 87A, the line patterns 196 corresponding to adjacent nozzles N do not overlap each other, and the separate line patterns 196 in which all nozzles can be distinguished from other nozzles N are formed. Accordingly, the test chart 87A is a so-called "1 on n off" line pattern.

In the test chart 87A, as indicated by "non-ejection" in a rectangular frame in the drawing, a line pattern 196 corresponding to a non-ejection nozzle incapable of ejecting ink droplets is missing. In the test chart 87A, as indicated by "deflection" in a rectangular frame in the drawing, a line pattern 196 corresponding to a deflected nozzle with an increasing amount of flight deflection of ink is deflected. For this reason, it is possible to specify the position of a failure nozzle N (corresponding to a failure element of the invention), such as a non-ejection nozzle or a deflected nozzle, based on the reading result of the test chart 87A. The failure nozzle N is not limited to a non-ejection nozzle or a deflected nozzle, and includes an abnormal ejection nozzle where various ejection abnormalities are generated.

The inline sensor 82 reads the test chart 87A recorded on the recording medium 14 at the timing at which the recording medium 14 passes through the imaging area of the inline sensor 82 after the test chart 87A has been recorded. At this time, image light of the test chart 87A is shifted and duplexed at least in the X direction by birefringence in the birefringent plate 91. The duplexed image light of the test chart 87A is imaged by the image sensor 92, and an imaging signal obtained by imaging is output from the image sensor 92 to the failure nozzle detection unit 190.

Figure 16A:
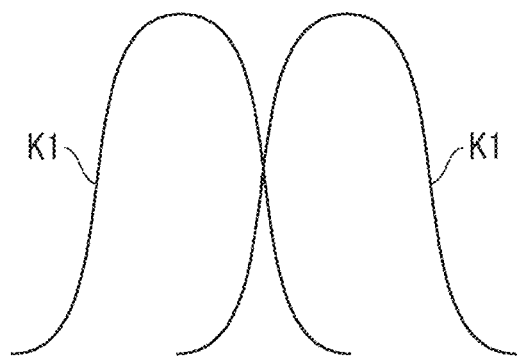
FIGS. 16A and 16B are explanatory views illustrating image light of a line pattern of a test chart incident on an imaging surface of an image sensor.
Figure 16B:
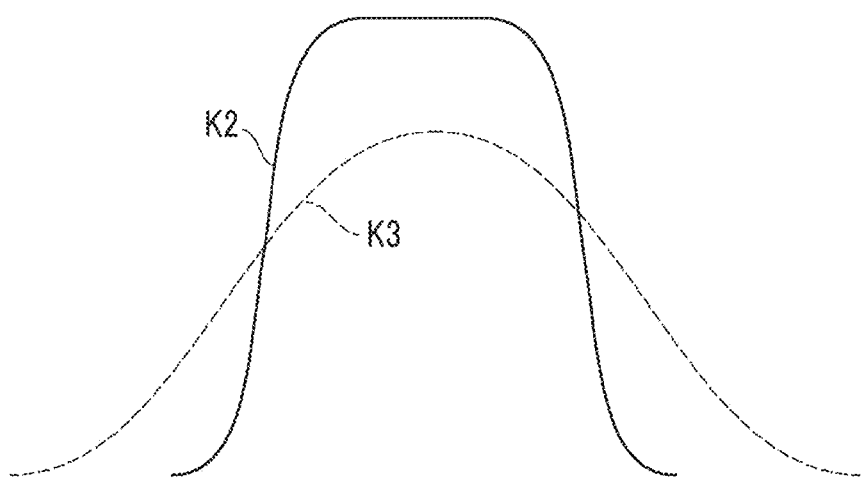

FIGS. 16A and 16B are explanatory views illustrating image light of the line pattern 196 of the test chart 87A incident on the image sensor 92. As described above, since image light of the test chart 87A is duplexed by birefringence, image light of the line pattern 196 is also duplexed. For this reason, image light obtained by adding duplexed image light K1 of the line pattern 196 shown in FIG. 16A, that is, image light K2 shown in FIG. 16B is incident on the imaging surface (read pixels 92*a*) of the image sensor. The rising angle and the falling angle of the edge of the light quantity distribution of image light K2 are made sharp compared to a case where image light is expanded or blurred without performing birefringence. Therefore, it is possible to accurately determine the position of the line pattern 196 on the read pixels 92*a*.

If image light of the test chart 87A (line pattern 196) is expanded or blurred without duplexing, as indicated by a dotted line in FIG. 16B, the rising angle and the falling angle of the edge of the light quantity distribution of image light K3 of the line pattern 196 incident on the imaging surface of the image sensor 92 are made gentle compared to a case where image light is duplexed. As a result, since it is not possible to accurately determine the position of the line pattern 196, it may not be possible to accurately detect the failure nozzle N, such as a deflected nozzle.

In contrast, in the inline sensor 82 of the invention which duplexes and images image light of the test chart 87A (line pattern 196), as described above, it is possible to accurately determine the position of the line pattern 196. Therefore, the inline sensor 82 of the invention can be used for the detection of the failure nozzle N.

Returning to FIG. 15, the failure nozzle detection unit 190 detects the position of the failure nozzle N by analyzing the imaging signal (reading result) of the test chart 87A input from the inline sensor 82, generates failure nozzle information 198 (for example, nozzle number) representing the position of the failure nozzle N, and outputs the failure nozzle information 198 to the print control unit 180. The failure nozzle information 198 is stored in the memory 175 or the like from the print control unit 180 through the system controller 172.

Figure 17:
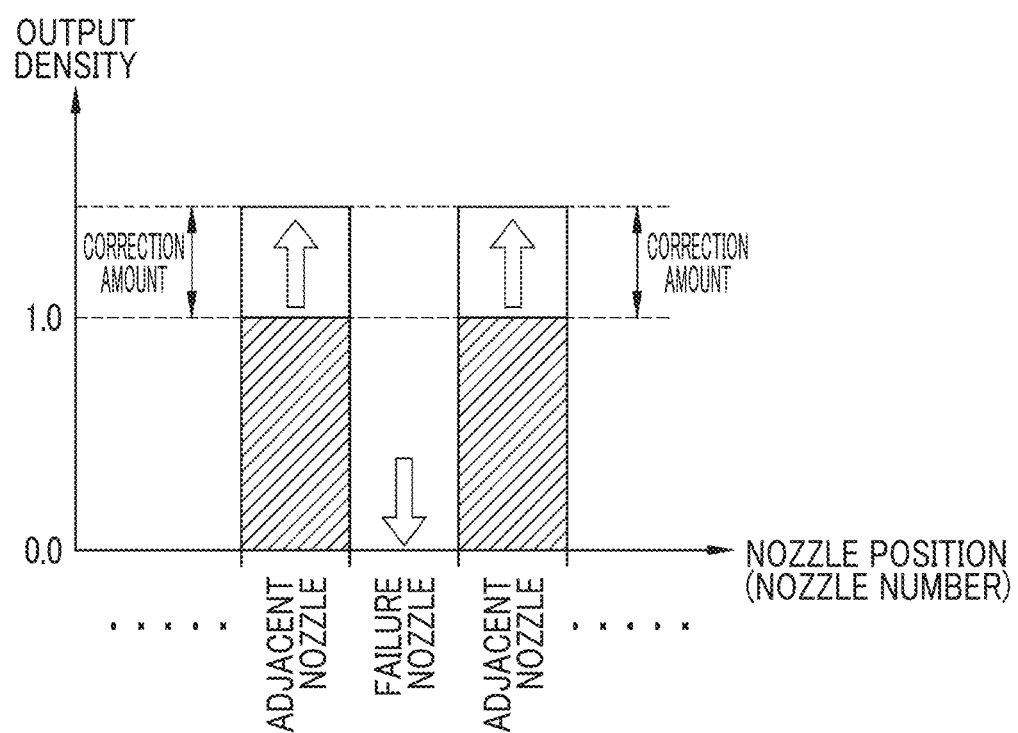
FIG. 17 is an explanatory view illustrating a non-ejection correction process by a correction processing unit.

FIG. 17 is an explanatory view illustrating a non-ejection correction process by the correction processing unit 192. As shown in FIG. 17, the correction processing unit 192 refers to the failure nozzle information 198 stored in the memory 175 or the like, and when the failure nozzle N is generated among the nozzles N, specifies the position (nozzle number or the like) of the failure nozzle N. The correction processing unit 192 performs an output stop process for stopping the ejection (output) of ink droplets from the specified failure nozzle N. The correction processing unit 192 performs a signal conversion process on print data corresponding to an adjacent nozzle N such that the amount of ejection of ink droplets of a normal nozzle N adjacent to the failure nozzle N is increased by a predetermined correction amount. In this way, the non-ejection correction process for stopping the ejection of ink droplets from the failure nozzle N or for increasing the amount of ejection of ink droplets of the adjacent nozzle N is performed, whereby it is possible to suppress the occurrence of the image defect 100 (stripe unevenness) due the failure nozzle N.

As described above, in the ink jet recording apparatus 10A, the failure nozzle N can be detected using the inline sensor 82 for use in detecting the image defect 100, and the non-ejection correction process can be performed based on the detection result. That is, since the inline sensor 82 can be used for both the detection of the image defect 100 and the detection of the failure nozzle N, it is possible to suppress an increase in manufacturing cost of the ink jet recording apparatus 10A.

[Another Solution]

In the foregoing first embodiment, although the width of the image of the image defect 100 in the X direction on the read pixel 92*a* is expanded by performing birefringence of image light of the test chart 87 using the birefringent plate 91, for example, the width of the image of the image defect 100 in the X direction on the read pixel 92*a* may be expanded by expanding the image of the test chart 87 on the imaging surface of the image sensor 92.

Specifically, an aperture stop or the like is disposed on the optical path of image light of the test chart 87 in the inline sensor 82, instead of the birefringent plate 91, and an aperture restriction for narrowing the aperture diameter of the aperture stop is performed. With this, a modulation transfer function (MTF) of the image of the test chart 87 is degraded, and the image of the test chart 87 is blurred. Therefore, it is possible to expand the image of the test chart 87 on the imaging surface of the image sensor 92. For example, the aperture diameter of the aperture stop is made half, whereby the size of the image of the test chart 87 on the imaging surface of the image sensor 92 is roughly twice or more.

The image of the test chart 87 on the imaging surface of the image sensor 92 may be blurred and expanded by inserting an element, which applies aberration (wavefront phase difference), or an element, which applies a scattering characteristic, on the optical path of image light of the test chart 87 in the inline sensor 82, instead of the birefringent plate 91.

The image of the test chart 87 on the imaging surface may be blurred and expanded by shifting the position of the lens 90 or the image sensor 92 in the inline sensor 82 in the optical axis OA direction and defocusing the image of the test chart 87 on the imaging surface of the image sensor 92.

[Others]

In the foregoing embodiments, although the ink jet recording apparatus using the pressure drum transport method has been described, the invention can be applied to an ink jet recording apparatus using a different transport method.

In the foregoing embodiments, although the inline sensor 82 or the image defect detection unit 185 is provided in the ink jet recording apparatus, the inline sensor 82 or the image defect detection unit 185 may be provided in an image recording apparatus having a single-pass recording head other than the ink jet recording apparatus.

In the foregoing embodiments, although the inline sensor 82 is provided in the ink jet recording apparatus, the inline sensor 82 corresponding to an imaging unit of the invention may be provided separately from the ink jet recording apparatus. The inline sensor 82 and the image defect detection unit 185 corresponding to an image defect detection device of the invention may be provided separately from the ink jet recording apparatus. That is, the image defect detection device of the invention may be provided independently from the ink jet recording apparatus.

The invention is not limited to the above-described embodiments, and it is needless to say that various modifications can be made without departing from the spirit of the invention.

What is claimed is:

1. An image defect detection device comprising:
   an image reading unit which reads an image recorded on a recording medium by a single-pass recording head, which is relatively moved in a first direction with respect to the recording medium, the image reading unit having a plurality of read pixels arranged in a second direction intersecting the first direction;
   a birefringent plate which shifts and duplexes the image read by the image reading unit at least in the second direction by performing birefringence of image light of the image incident on the image reading unit; and
   a detection unit which detects image defect included in the image and extended in the first direction based on the reading result of the image read by the image reading unit through the birefringent plate,
   wherein the birefringent plate makes the width of the image defect in the second direction on the read pixels greater than the pitch of the read pixels by duplexing the image.

2. The image defect detection device according to claim 1,
   wherein, when the width of the image defect in the second direction on the read pixels in the case where the birefringent plate is not disposed is W, the pitch of the read pixels is P, and a shift amount of the image duplexed by the birefringent plate in the second direction is d, if the pitch of the read pixels satisfies P≥W, the birefringent plate shifts the image in the second direction by d, which satisfies Expressions (2) and (3) when the width of the image defect in the second direction on the read pixels is expanded from W to WA represented by Expression (1) by duplexing the image.

$$WA = W + d \quad (1)$$

$$d < W \quad (2)$$

$$WA \geq P \quad (3).$$

3. The image defect detection device according to claim 2,
   wherein the shift amount is adjustable by adjusting the thickness of the birefringent plate or the number of the birefringent plates.

4. The image defect detection device according to claim 2,
   wherein the shift amount is adjustable by adjusting the angle of the birefringent plate within a plane perpendicular to the optical axis of the image light.

5. The image defect detection device according to claim 1, further comprising:
   an optical system which guides the image light of the image recorded on the recording medium to the image reading unit,
   wherein the birefringent plate is provided in the optical path of the image light inside the optical system.

6. The image defect detection device according to claim 2, further comprising:
   an optical system which guides the image light of the image recorded on the recording medium to the image reading unit,
   wherein the birefringent plate is provided in the optical path of the image light inside the optical system.

7. The image defect detection device according to claim 3, further comprising:
   an optical system which guides the image light of the image recorded on the recording medium to the image reading unit,
   wherein the birefringent plate is provided in the optical path of the image light inside the optical system.

8. The image defect detection device according to claim 4, further comprising:
   an optical system which guides the image light of the image recorded on the recording medium to the image reading unit,
   wherein the birefringent plate is provided in the optical path of the image light inside the optical system.

9. The image defect detection device according to claim 1, further comprising:
   a moving unit which relatively moves one of the recording medium and the image reading unit in the first direction with respect to the other,
   wherein the image reading unit reads the image by single relative movement with respect to the recording medium.

10. The image defect detection device according to claim 2, further comprising:
    a moving unit which relatively moves one of the recording medium and the image reading unit in the first direction with respect to the other,
    wherein the image reading unit reads the image by single relative movement with respect to the recording medium.

11. The image defect detection device according to claim 3, further comprising:
    a moving unit which relatively moves one of the recording medium and the image reading unit in the first direction with respect to the other,
    wherein the image reading unit reads the image by single relative movement with respect to the recording medium.

12. The image defect detection device according to claim 4, further comprising:
a moving unit which relatively moves one of the recording medium and the image reading unit in the first direction with respect to the other,
wherein the image reading unit reads the image by single relative movement with respect to the recording medium.

13. The image defect detection device according to claim 5, further comprising:
a moving unit which relatively moves one of the recording medium and the image reading unit in the first direction with respect to the other,
wherein the image reading unit reads the image by single relative movement with respect to the recording medium.

14. The image defect detection device according to claim 1,
wherein the recording head has a plurality of recording elements arranged in the second direction, and
the detection unit detects stripe unevenness caused by a failure element among the recording elements of the recording head as the image defect.

15. The image defect detection device according to claim 2,
wherein the recording head has a plurality of recording elements arranged in the second direction, and
the detection unit detects stripe unevenness caused by a failure element among the recording elements of the recording head as the image defect.

16. The image defect detection device according to claim 3,
wherein the recording head has a plurality of recording elements arranged in the second direction, and
the detection unit detects stripe unevenness caused by a failure element among the recording elements of the recording head as the image defect.

17. The image defect detection device according to claim 4,
wherein the recording head has a plurality of recording elements arranged in the second direction, and
the detection unit detects stripe unevenness caused by a failure element among the recording elements of the recording head as the image defect.

18. The image defect detection device according to claim 5,
wherein the recording head has a plurality of recording elements arranged in the second direction, and
the detection unit detects stripe unevenness caused by a failure element among the recording elements of the recording head as the image defect.

19. An image defect detection method using the image defect detection device according to claim 1, comprising:
an image reading step of reading an image recorded on a recording medium by a single-pass recording head, which is relatively moved in a first direction with respect to the recording medium, the image being read by an image reading unit having a plurality of read pixels arranged in a second direction intersecting the first direction;
a birefringence step of shifting and duplexing the image read by the image reading unit at least in the second direction by performing birefringence of image light of the image incident on the image reading unit with a birefringent plate; and
a detection step of detecting image defect included in the image and extended in the first direction based on the reading result of the image read by the image reading unit through the birefringent plate,
wherein, in the birefringence step, the width of the image defect in the second direction on the read pixels is made greater than the pitch of the read pixels by duplexing the image.

20. An imaging unit used for the image defect detection device according to claim 1, comprising:
an image reading unit which reads an image recorded on a recording medium by a single-pass recording head, which is relatively moved in a first direction with respect to the recording medium, the image reading unit having a plurality of read pixels arranged in a second direction intersecting the first direction; and
a birefringent plate which shifts and duplexes the image read by the image reading unit at least in the second direction by performing birefringence of image light of the image incident on the image reading unit, the birefringent plate making the width of image defect in the second direction on the read pixels greater than the pitch of the read pixels by duplexing the image, and the image defect being included in the image and extended in the first direction.

* * * * *